United States Patent
Steinberg

(10) Patent No.: US 10,846,117 B1
(45) Date of Patent: Nov. 24, 2020

(54) TECHNIQUE FOR ESTABLISHING SECURE COMMUNICATION BETWEEN HOST AND GUEST PROCESSES OF A VIRTUALIZATION ARCHITECTURE

(71) Applicant: FireEye, Inc., Milpitas, CA (US)

(72) Inventor: Udo Steinberg, Braunschweig (DE)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 15/237,377

(22) Filed: Aug. 15, 2016

Related U.S. Application Data

(60) Provisional application No. 62/266,109, filed on Dec. 11, 2015, provisional application No. 62/265,751, filed on Dec. 10, 2015.

(51) Int. Cl.
*G06F 9/455* (2018.01)
*G06F 9/54* (2006.01)
(Continued)

(52) U.S. Cl.
CPC ........ *G06F 9/45558* (2013.01); *G06F 9/4812* (2013.01); *G06F 9/544* (2013.01);
(Continued)

(58) Field of Classification Search
CPC ....... G06F 9/45558; G06F 2009/45583; G06F 12/109; G06F 2009/45579; G06F 9/45533;
(Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Riley et al, Guest-Transparent Prevention of Kernel Rootkits with VMM-Based Memory Shadowing. In: Lippmann R., Kirda E., Trachtenberg A. (eds) Recent Advances in Intrusion Detection. RAID 2008. Lecture Notes in Computer Science, vol. 5230. Springer, Berlin, Heidelberg (Year: 2008).*

(Continued)

*Primary Examiner* — Abu Zar Ghaffari
(74) *Attorney, Agent, or Firm* — Rutan & Tucker, LLP

(57) ABSTRACT

Secure communication is established between a hyper-process of the virtualization layer (e.g., host) and an agent process in the guest operating system (e.g., guest) using a virtual communication device which, in an embodiment, is implemented as shared memory having two memory buffers. A guest-to-host buffer is used as a first message box configured to provide unidirectional communication from the agent to the virtualization layer and a host-to-guest buffer is used as a second message box configured to provide unidirectional communication from the virtualization layer to the agent. The buffers cooperate to transform the virtual device into a low-latency, high-bandwidth communication interface configured for bi-directional transfer of information between the agent process and the hyper-process of the virtualization layer, wherein the communication interface also includes a signaling (doorbell) mechanism configured to notify the processes that information is available for transfer over the interface.

33 Claims, 8 Drawing Sheets

(51) Int. Cl.
  *G06F 21/56* (2013.01)
  *G06F 9/48* (2006.01)
  *G06F 21/55* (2013.01)
(52) U.S. Cl.
  CPC .............. *G06F 9/545* (2013.01); *G06F 21/56* (2013.01); *G06F 9/45533* (2013.01); *G06F 21/554* (2013.01); *G06F 2009/45579* (2013.01); *G06F 2009/45583* (2013.01)
(58) Field of Classification Search
  CPC ......... G06F 9/4812; G06F 2009/45587; G06F 21/53; G06F 21/554; G06F 21/56; G06F 9/45545; G06F 9/544; G06F 9/545
  See application file for complete search history.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,961,806 B1 * | 11/2005 | Agesen ............... G06F 9/45537 711/148 |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,103,646 B1 * | 9/2006 | Suzuki ................. H04L 67/125 370/395.42 |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,865,893 B1 | 1/2011 | Omelyanchuk et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,104,034 B2 * | 1/2012 | Drepper ............... G06F 9/45508 717/118 |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |

(56) References Cited

U.S. PATENT DOCUMENTS

| | | | |
|---|---|---|---|
| 8,225,317 B1 * | 7/2012 | Chiueh | G06F 9/455 713/164 |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,271,978 B2 | 9/2012 | Bennett et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,332,571 B1 | 12/2012 | Edwards, Sr. | |
| 8,365,286 B2 | 1/2013 | Poston | |
| 8,365,297 B1 | 1/2013 | Parshin et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,381,299 B2 | 2/2013 | Stolfo et al. | |
| 8,387,046 B1 | 2/2013 | Montague | |
| 8,402,529 B1 | 3/2013 | Green et al. | |
| 8,464,340 B2 | 6/2013 | Ahn et al. | |
| 8,479,174 B2 | 7/2013 | Chiriac | |
| 8,479,276 B1 | 7/2013 | Vaystikh | |
| 8,479,286 B2 | 7/2013 | Dalcher et al. | |
| 8,479,291 B1 | 7/2013 | Bodke | |
| 8,479,292 B1 | 7/2013 | Li et al. | |
| 8,510,827 B1 | 8/2013 | Leake et al. | |
| 8,510,828 B1 | 8/2013 | Guo et al. | |
| 8,510,842 B2 | 8/2013 | Amit et al. | |
| 8,516,478 B1 | 8/2013 | Edwards et al. | |
| 8,516,590 B1 | 8/2013 | Ranadive et al. | |
| 8,516,593 B2 | 8/2013 | Aziz | |
| 8,522,236 B2 | 8/2013 | Zimmer et al. | |
| 8,522,348 B2 | 8/2013 | Chen et al. | |
| 8,528,086 B1 | 9/2013 | Aziz | |
| 8,533,824 B2 | 9/2013 | Hutton et al. | |
| 8,539,582 B1 | 9/2013 | Aziz et al. | |
| 8,549,638 B2 | 10/2013 | Aziz | |
| 8,555,391 B1 | 10/2013 | Demir et al. | |
| 8,561,177 B1 | 10/2013 | Aziz et al. | |
| 8,566,476 B2 | 10/2013 | Shiffer et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,656,482 B1 * | 2/2014 | Tosa | H04L 63/08 713/153 |
| 8,682,054 B2 | 3/2014 | Xue et al. | |
| 8,682,812 B1 | 3/2014 | Ranjan | |
| 8,689,333 B2 | 4/2014 | Aziz | |
| 8,695,096 B1 | 4/2014 | Zhang | |
| 8,713,631 B1 | 4/2014 | Pavlyushchik | |
| 8,713,681 B2 | 4/2014 | Silberman et al. | |
| 8,726,392 B1 | 5/2014 | McCorkendale et al. | |
| 8,739,280 B2 | 5/2014 | Chess et al. | |
| 8,775,715 B2 | 7/2014 | Tsirkin et al. | |
| 8,776,229 B1 | 7/2014 | Aziz | |
| 8,782,792 B1 | 7/2014 | Bodke | |
| 8,789,172 B2 | 7/2014 | Stolfo et al. | |
| 8,789,178 B2 | 7/2014 | Kejriwal et al. | |
| 8,793,278 B2 | 7/2014 | Frazier et al. | |
| 8,793,787 B2 | 7/2014 | Ismael et al. | |
| 8,805,947 B1 | 8/2014 | Kuzkin et al. | |
| 8,806,647 B1 | 8/2014 | Daswani et al. | |
| 8,832,352 B2 | 9/2014 | Tsirkin et al. | |
| 8,832,829 B2 | 9/2014 | Manni et al. | |
| 8,839,245 B1 | 9/2014 | Khajuria et al. | |
| 8,850,570 B1 | 9/2014 | Ramzan | |
| 8,850,571 B2 | 9/2014 | Staniford et al. | |
| 8,881,234 B2 | 11/2014 | Narasimhan et al. | |
| 8,881,271 B2 | 11/2014 | Butler, II | |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,949,257 B2 | 2/2015 | Shiffer et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,003,402 B1 | 4/2015 | Carbone et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,092,625 B1 | 7/2015 | Kashyap | |
| 9,104,867 B1 | 8/2015 | Thioux et al. | |
| 9,106,630 B2 | 8/2015 | Frazier et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,264 B1 * | 11/2015 | Steffen | G06F 9/542 |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |
| 9,241,010 B1 | 1/2016 | Bennett et al. | |
| 9,251,343 B1 | 2/2016 | Vincent et al. | |
| 9,262,635 B2 | 2/2016 | Paithane et al. | |
| 9,268,936 B2 | 2/2016 | Butler | |
| 9,275,229 B2 | 3/2016 | LeMasters | |
| 9,282,109 B1 | 3/2016 | Aziz et al. | |
| 9,292,686 B2 | 3/2016 | Ismael et al. | |
| 9,294,501 B2 | 3/2016 | Mesdaq et al. | |
| 9,300,686 B2 | 3/2016 | Pidathala et al. | |
| 9,306,960 B1 | 4/2016 | Aziz | |
| 9,306,974 B1 | 4/2016 | Aziz et al. | |
| 9,311,479 B1 | 4/2016 | Manni et al. | |
| 9,355,247 B1 | 5/2016 | Thioux et al. | |
| 9,356,944 B1 | 5/2016 | Aziz | |
| 9,363,280 B1 | 6/2016 | Rivlin et al. | |
| 9,367,681 B1 | 6/2016 | Ismael et al. | |
| 9,398,028 B1 | 7/2016 | Karandikar et al. | |
| 9,413,781 B2 | 8/2016 | Cunningham et al. | |
| 9,426,071 B1 | 8/2016 | Caldejon et al. | |
| 9,430,646 B1 | 8/2016 | Mushtaq et al. | |
| 9,432,389 B1 | 8/2016 | Khalid et al. | |
| 9,436,619 B2 * | 9/2016 | Woolley | G06F 12/1458 |
| 9,438,613 B1 | 9/2016 | Paithane et al. | |
| 9,438,622 B1 | 9/2016 | Staniford et al. | |
| 9,438,623 B1 | 9/2016 | Thioux et al. | |
| 9,459,901 B2 | 10/2016 | Jung et al. | |
| 9,459,912 B1 * | 10/2016 | Durniak | G06F 21/6218 |
| 9,467,460 B1 | 10/2016 | Otvagin et al. | |
| 9,483,644 B1 | 11/2016 | Paithane et al. | |
| 9,495,180 B2 | 11/2016 | Ismael | |
| 9,497,213 B2 | 11/2016 | Thompson et al. | |
| 9,507,935 B2 | 11/2016 | Ismael et al. | |
| 9,516,057 B2 | 12/2016 | Aziz | |
| 9,519,782 B2 | 12/2016 | Aziz et al. | |
| 9,536,091 B2 | 1/2017 | Paithane et al. | |
| 9,537,972 B1 | 1/2017 | Edwards et al. | |
| 9,560,059 B1 | 1/2017 | Islam | |
| 9,565,202 B1 | 2/2017 | Kindlund et al. | |
| 9,591,015 B1 | 3/2017 | Amin et al. | |
| 9,591,020 B1 | 3/2017 | Aziz | |
| 9,594,904 B1 | 3/2017 | Jain et al. | |
| 9,594,905 B1 | 3/2017 | Ismael et al. | |
| 9,594,912 B1 | 3/2017 | Thioux et al. | |
| 9,609,007 B1 | 3/2017 | Rivlin et al. | |
| 9,626,509 B1 | 4/2017 | Khalid et al. | |
| 9,628,498 B1 | 4/2017 | Aziz et al. | |
| 9,628,507 B2 | 4/2017 | Haq et al. | |

(56) References Cited

U.S. PATENT DOCUMENTS

| | | |
|---|---|---|
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,753,754 B2 * | 9/2017 | Howell ............... G06F 11/1484 |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,592 B2 * | 12/2017 | Sarangdhar ......... G06F 9/45558 |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0078121 A1 * | 6/2002 | Ballantyne ............ G06F 9/4812 718/102 |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0037089 A1 * | 2/2003 | Cota-Robles ......... G06F 9/4881 718/1 |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2004/0268347 A1 * | 12/2004 | Knauerhase ......... G06F 9/45533 718/1 |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |

(56) References Cited

U.S. PATENT DOCUMENTS

| | | |
|---|---|---|
| 2005/0210533 A1 | 9/2005 | Copeland et al. |
| 2005/0216759 A1 | 9/2005 | Rothman et al. |
| 2005/0216920 A1* | 9/2005 | Tewari .................. G06F 9/5011 719/324 |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1* | 6/2006 | Anderson ........... G06F 9/45533 718/1 |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0184713 A1* | 8/2006 | Hildner ............... G06F 12/1036 711/6 |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288189 A1 | 12/2006 | Seth et al. |
| 2006/0288417 A1 | 12/2006 | Bookbinder et al. |
| 2007/0006227 A1* | 1/2007 | Kinney .................. G06F 9/544 718/1 |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0180454 A1 | 8/2007 | Fujimoto et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0300227 A1 | 12/2007 | Mall et al. |
| 2008/0005782 A1 | 1/2008 | Aziz |
| 2008/0018122 A1 | 1/2008 | Zierler et al. |
| 2008/0028124 A1 | 1/2008 | Tago |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0059556 A1 | 3/2008 | Greenspan et al. |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307188 A1 | 12/2008 | Franaszek et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013149 A1 | 1/2009 | Uhlig et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0106754 A1 | 4/2009 | Liu et al. |
| 2009/0113110 A1* | 4/2009 | Chen .................. G06F 9/45558 711/6 |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144510 A1* | 6/2009 | Wibling ................ G06F 9/5016 711/147 |
| 2009/0144823 A1 | 6/2009 | Lamastra et al. |
| 2009/0158430 A1 | 6/2009 | Borders |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |

(56) References Cited

U.S. PATENT DOCUMENTS

| | | |
|---|---|---|
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0307689 A1* | 12/2009 | Sudhakar ............ G06F 9/45558 718/1 |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |
| 2010/0030996 A1 | 2/2010 | Butler, II |
| 2010/0031353 A1 | 2/2010 | Thomas et al. |
| 2010/0031360 A1 | 2/2010 | Seshadri |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0229173 A1* | 9/2010 | Subrahmanyam .. G06F 9/45533 718/103 |
| 2010/0235831 A1 | 9/2010 | Dittmer |
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | St Hlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0161955 A1* | 6/2011 | Woller .................. G06F 9/4406 718/1 |
| 2011/0167422 A1 | 7/2011 | Eom et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0179417 A1* | 7/2011 | Inakoshi ............. G06F 9/45558 718/1 |
| 2011/0197003 A1* | 8/2011 | Serebrin ............. G06F 9/45558 710/267 |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320556 A1 | 12/2011 | Reuther |
| 2011/0320682 A1 | 12/2011 | McDougall et al. |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084517 A1* | 4/2012 | Post ..................... G06F 9/45541 711/153 |
| 2012/0084859 A1 | 4/2012 | Radinsky et al. |
| 2012/0093160 A1* | 4/2012 | Tonsing .............. H04L 12/5602 370/392 |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0144156 A1 | 6/2012 | Matsuda |
| 2012/0159478 A1* | 6/2012 | Spradlin ............. G06F 11/3636 718/1 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0272241 A1* | 10/2012 | Nonaka ................ G06F 9/5077 718/1 |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0125115 A1* | 5/2013 | Tsirkin ................ G06F 9/45558 718/1 |
| 2013/0139264 A1 | 5/2013 | Brinkley et al. |
| 2013/0145055 A1 | 6/2013 | Kegel et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0191924 A1 | 6/2013 | Tedesco et al. |
| 2013/0174147 A1 | 7/2013 | Sahita |
| 2013/0174214 A1 | 7/2013 | Duncan |
| 2013/0185789 A1 | 7/2013 | Hagiwara et al. |
| 2013/0185795 A1 | 7/2013 | Winn et al. |

(56) References Cited

U.S. PATENT DOCUMENTS

| | | |
|---|---|---|
| 2013/0185798 A1 | 7/2013 | Saunders et al. |
| 2013/0191824 A1 | 7/2013 | Muff et al. |
| 2013/0191915 A1 | 7/2013 | Antonakakis et al. |
| 2013/0196649 A1 | 8/2013 | Paddon et al. |
| 2013/0227680 A1 | 8/2013 | Pavlyushchik |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0283370 A1 | 10/2013 | Vipat |
| 2013/0291109 A1 | 10/2013 | Staniford et al. |
| 2013/0298243 A1 | 11/2013 | Kumar et al. |
| 2013/0305006 A1 | 11/2013 | Altman et al. |
| 2013/0312099 A1 | 11/2013 | Edwards |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0332926 A1* | 12/2013 | Jakoljevic ........... G06F 9/45533 718/1 |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0115652 A1 | 4/2014 | Kapoor |
| 2014/0130158 A1 | 5/2014 | Wang et al. |
| 2014/0137180 A1* | 5/2014 | Lukacs ................... G06F 21/53 726/1 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189185 A1* | 7/2014 | Yamashita ............ G06F 13/24 710/267 |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0281560 A1* | 9/2014 | Ignatchenko ........... G06F 21/57 713/181 |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1 | 11/2014 | Pratt |
| 2014/0351935 A1 | 11/2014 | Shao et al. |
| 2014/0373012 A1* | 12/2014 | Ylitalo ................. G06F 9/45533 718/1 |
| 2014/0380009 A1 | 12/2014 | Lemay et al. |
| 2014/0380308 A1* | 12/2014 | Hassine .............. G06F 9/45558 718/1 |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0085665 A1* | 3/2015 | Kompella ........... H04L 47/2483 370/236 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0178110 A1 | 6/2015 | Li et al. |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199514 A1 | 7/2015 | Tosa |
| 2015/0199531 A1 | 7/2015 | Ismael et al. |
| 2015/0199532 A1 | 7/2015 | Ismael |
| 2015/0220735 A1 | 8/2015 | Paithane et al. |
| 2015/0242227 A1 | 8/2015 | Nair |
| 2015/0269004 A1 | 9/2015 | Gainey, Jr. et al. |
| 2015/0293776 A1* | 10/2015 | Persson ............... G06F 9/45558 718/1 |
| 2015/0336005 A1 | 11/2015 | Melnick et al. |
| 2015/0355919 A1* | 12/2015 | Gatherer ................. G06F 9/455 718/1 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048464 A1* | 2/2016 | Nakajima ........... G06F 12/1475 711/152 |
| 2016/0055017 A1 | 2/2016 | Beveridge et al. |
| 2016/0110291 A1 | 4/2016 | Gordon et al. |
| 2016/0117190 A1* | 4/2016 | Sankaran .............. G06F 9/4812 710/267 |
| 2016/0117498 A1 | 4/2016 | Saxena et al. |
| 2016/0127393 A1 | 5/2016 | Aziz et al. |
| 2016/0132349 A1* | 5/2016 | Bacher ................... G06F 21/53 718/1 |
| 2016/0132351 A1 | 5/2016 | Kashyap et al. |
| 2016/0147993 A1 | 5/2016 | Xu et al. |
| 2016/0191547 A1 | 6/2016 | Zafar et al. |
| 2016/0191550 A1 | 6/2016 | Ismael et al. |
| 2016/0246730 A1 | 8/2016 | Gandhi et al. |
| 2016/0248818 A1* | 8/2016 | Fries ................... H04L 67/2814 |
| 2016/0261612 A1 | 9/2016 | Mesdaq et al. |
| 2016/0285914 A1 | 9/2016 | Singh et al. |
| 2016/0299851 A1 | 10/2016 | Mattson, Jr. et al. |
| 2016/0301703 A1 | 10/2016 | Aziz |
| 2016/0306749 A1 | 10/2016 | Tsirkin et al. |
| 2016/0335110 A1 | 11/2016 | Paithane et al. |
| 2016/0337437 A1 | 11/2016 | Gartsbein et al. |
| 2016/0366130 A1* | 12/2016 | Jung .................... H04L 63/08 |
| 2017/0083703 A1 | 3/2017 | Abbasi et al. |
| 2017/0262306 A1 | 9/2017 | Wang et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0276038 A1* | 9/2018 | Malik ................. G06F 9/45558 |
| 2018/0288077 A1 | 10/2018 | Siddiqui et al. |
| 2018/0357093 A1* | 12/2018 | Cong ................... G06F 21/602 |

FOREIGN PATENT DOCUMENTS

| | | |
|---|---|---|
| KR | 101678607 B1 * | 11/2016 |
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | WO2012/135192 | 10/2012 |
| WO | WO2012/154664 | 11/2012 |
| WO | WO-2012/177464 A1 | 12/2012 |
| WO | 2013/067505 A1 | 5/2013 |
| WO | WO-2013/091221 A1 | 6/2013 |
| WO | WO-2014/004747 A2 | 1/2014 |

OTHER PUBLICATIONS

Zhang et al, "Performance analysis towards a KVM-Based embedded real-time virtualization architecture," 5th International Conference on Computer Sciences and Convergence Information Technology, Seoul, 2010, pp. 421-426. (Year: 2010).*

Hoffman et al, ensuring operating system kernel integrity, ASPLOS' 11, ACM, pp. 279-290 (Year: 2011).*

Amiri Sani, Ardalan, et al. "I/O paravirtualization at the device file boundary." ACM SIGPLAN Notices 49.4 (2014), pp. 319-332.

"Bromium vSentry—Defeat the Unknown Attack," Oct. 10, 2013, 11 pages.

Bromium Corp, "Bromium vSentry, Defeat of the Unknown Attack," downloaded from bromium.com/sites/default/files/Bromium-Whitepaper-vSentry_2.pdf on Dec. 1, 2013.

(56) References Cited

OTHER PUBLICATIONS

Bromium Corp, "Live Attack Visualization and Analysis, What does a Malware attack look like?" bromium.com/sites/default/files/Bromium%20LAVA%20WP_2.pdf on Dec. 1, 2013.
Chen, Peter M., and Brian D. Noble. "When virtual is better than real [operating system relocation to virtual machines]." Hot Topics in Operating Systems, 2001. Proceedings of the Eighth Workshop on. IEEE, 2001.
Gao, Debin, Michael K. Reiter, and Dawn Xiaodong Song. "On Gray-Box Program Tracking for Anomaly Detection." USENIX security symposium. 2004.
Garfinkel, Tal, and Mendel Rosenblum. "A Virtual Machine Introspection Based Architecture for Intrusion Detection." NDSS. 2003.
Gerzon, Gideon—"Intel® Virtualization Technology Processor Virtualization Extensions and Intel® Trusted execution Technology." (2007), 53 pages.
Heiser, Gernot, and Ben Leslie. "The OKL4 Microvisor: Convergence point of microkernels and hypervisors." Proceedings of the first ACM asia-pacific workshop on Workshop on systems. ACM, 2010.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008.
Intel—"Intel 64 and IA-32 Architectures Software Developer's Manual, vol. 3B: System Programming Guide." Part 2, 2011, (Section 2.83, pp. 51-59), 1026 pages.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.
Kapravelos, Alexandros, et al. "Revolver: An Automated Approach to the Detection of Evasive Web-based Malware." USENIX Security Symposium. 2013.
King, Samuel T., and Peter M. Chen. "SubVirt: Implementing malware with virtual machines." Security and Privacy, 2006 IEEE Symposium on. IEEE, 2006, 14 Pages.
Kivity et al. "kvm: the Linux virtual machine monitor." Proceedings of the Linux symposium. vol. 1. 2007, 8 pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004. Proceedings. 30th. IEEE, 2004.
Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09, Annual. IEEE, 2009.
Shah et al "Hardware-assisted Virtualization," 15-612 Operating System Practicum Carnegie Mellon University, Sep. 8, 2013, 28 pages.
Steinberg, Udo, and Bernhard Kauer. "NOVA: a microhypervisor-based secure virtualization architecture." Proceedings of the 5th European conference on Computer systems. ACM, 2010, 14 Pages.
Stumpf, Frederic, et al. "An approach to a trustworthy system architecture using virtualization." Autonomic and trusted computing. Springer Berlin Heidelberg, 2007. 191-202.
Sun, Kun, et al. "SecureSwitch: BIOS-Assisted Isolation and Switch between Trusted and Untrusted Commodity OSes." George Mason Feb. 26, 2013, 15 pages.
Wafaa, Andrew—"Introducing the 64-bit ARMv8 Architecture" Open Source Arm Ltd. EuroBSDCon conference, Malta, Sep. 28-29, 2013, 20 pages.
Wojtczuk, Rafal. "Subverting the Xen hypervisor." Black Hat USA 2008 (2008), pages.
Yan, Lok Kwong, et al. "Transparent and Extensible Malware Analysis by Combining Hardware Virtualization and Software Emulation." Internet Society, 2010. Downloaded from internetsociety.org/sites/default/files/05_1.pdf, 1 page.
"Mining Specification of Malicious Behavior"—Jha et al, UCSB, Sep. 2007 cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; Hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.

(56) References Cited

OTHER PUBLICATIONS

FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase © CMU, Carnegie Mellon University, 2007.
Hewlett Packard et al, "Advanced Configuration and Power Interface Specification," pp. 31-54, and 607-624, Nov. 13, 2013.
Hiroshi Shinotsuka, Malware Authors Using New Techniques to Evade Automated Threat Analysis Systems, Oct. 26, 2012, symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.

Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT Notification of Transmittal of the International Search Report and the Written Opinion of the International Searching Authority, or the Declaration, International Searching Authority, International Application No. PCT/US2014/071847, dated Mar. 26, 2015, 16 pages.
PCT Notification of Transmittal of the International Search Report and the Written Opinion of the International Searching Authority, or the Declaration, International Searching Authority, International Application No. PCT/US2014/071879, dated Apr. 28, 2015, 12 pages.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 15/229,770, filed Aug. 5, 2016 Non-Final Office Action dated Nov. 2, 2017.
U.S. Appl. No. 15/229,770, filed Aug. 5, 2016 Notice of Allowance dated May 18, 2018.
U.S. Appl. No. 15/230,215, filed Aug. 5, 2016 Non-Final Office Action dated Oct. 5, 2018.
U.S. Appl. No. 15/230,215, filed Aug. 5, 2016 Notice of Allowance dated Feb. 6, 2019.
U.S. Appl. No. 15/257,704, filed Sep. 6, 2016 Non-Final Office Action dated Mar. 12, 2018.
U.S. Appl. No. 15/257,704, filed Sep. 6, 2016 Notice of Allowance dated Sep. 19, 2018.
U.S. Appl. No. 15/199,871, filed Jun. 30, 2016.
U.S. Appl. No. 15/199,873, filed Jun. 30, 2016.
U.S. Appl. No. 15/199,876, filed Jun. 30, 2016.
U.S. Appl. No. 15/199,882, filed Jun. 30, 2016.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Nilliamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

(56) References Cited

OTHER PUBLICATIONS

Zhang et al., The Effects of Threading, Infection Time, and Multiple-Attacker Collaboration on Malware Propagation, Sep. 2009, IEEE 28th International Symposium on Reliable Distributed Systems, pp. 73-82.

U.S. Appl. No. 16/160,923, filed Oct. 15, 2018 Non-Final Office Action dated Feb. 27, 2020.

U.S. Appl. No. 16/160,923 filed Oct. 15, 2018 Final Office Action dated Aug. 31, 2020.

* cited by examiner

TECHNIQUE FOR ESTABLISHING SECURE COMMUNICATION BETWEEN HOST AND GUEST PROCESSES OF A VIRTUALIZATION ARCHITECTURE

RELATED APPLICATION

The present application claims priority from commonly owned Provisional Patent Application No. 62/266,109, entitled TECHNIQUE FOR ESTABLISHING SECURE COMMUNICATION BETWEEN HOST AND GUEST PROCESSES OF A VIRTUALIZATION ARCHITECTURE, filed on Dec. 11, 2015, and from commonly owned Provisional Patent Application No. 62/265,751 entitled TECHNIQUE FOR PROTECTING GUEST PROCESSES USING A LAYERED VIRTUALIZATION ARCHITECTURE, filed Dec. 10, 2015, the contents of which applications are incorporated herein by reference.

BACKGROUND

Technical Field

The present disclosure relates to virtualization architectures and, more specifically, to secure communication between processes of a guest operating system and a virtualization layer of a virtualization architecture.

Background Information

Data communication in a network involves the exchange of data between two or more entities interconnected by communication links and sub-networks (segments). The entities are typically software processes executing in operating systems of computers, such as endpoint nodes (endpoints) and intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers as well as operating system data structures. For example, malware content may be embedded within objects associated with a web page hosted by a malicious web site.

Various types of security enhanced nodes are often deployed at different segments of the networks. These nodes often employ virtualization systems having virtualization layers to provide enhanced security needed to uncover the presence of malware typically embedded within ingress content propagating over the different network segments. The enhanced security may include anti-virus scanning software that scans the ingress content for viruses and other forms of malware, as well as virtual machine architectures that replay the ingress content in guest operating systems so as to monitor behavior during execution and detect anomalies that may indicate the presence of malware. However, increasingly sophisticated malware may be able to compromise the virtual machines to avoid detection by, e.g., altering states of resources of the nodes, such as operating system data structures. Moreover, strict specifications for some nodes (e.g., endpoints) may require execution of software, despite known vulnerabilities and potential of infection by malware. Thus, a technique to ensure secure communication among the processes executing (as well as operating system data structures) in the guest operating systems and virtualization layers of the nodes is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
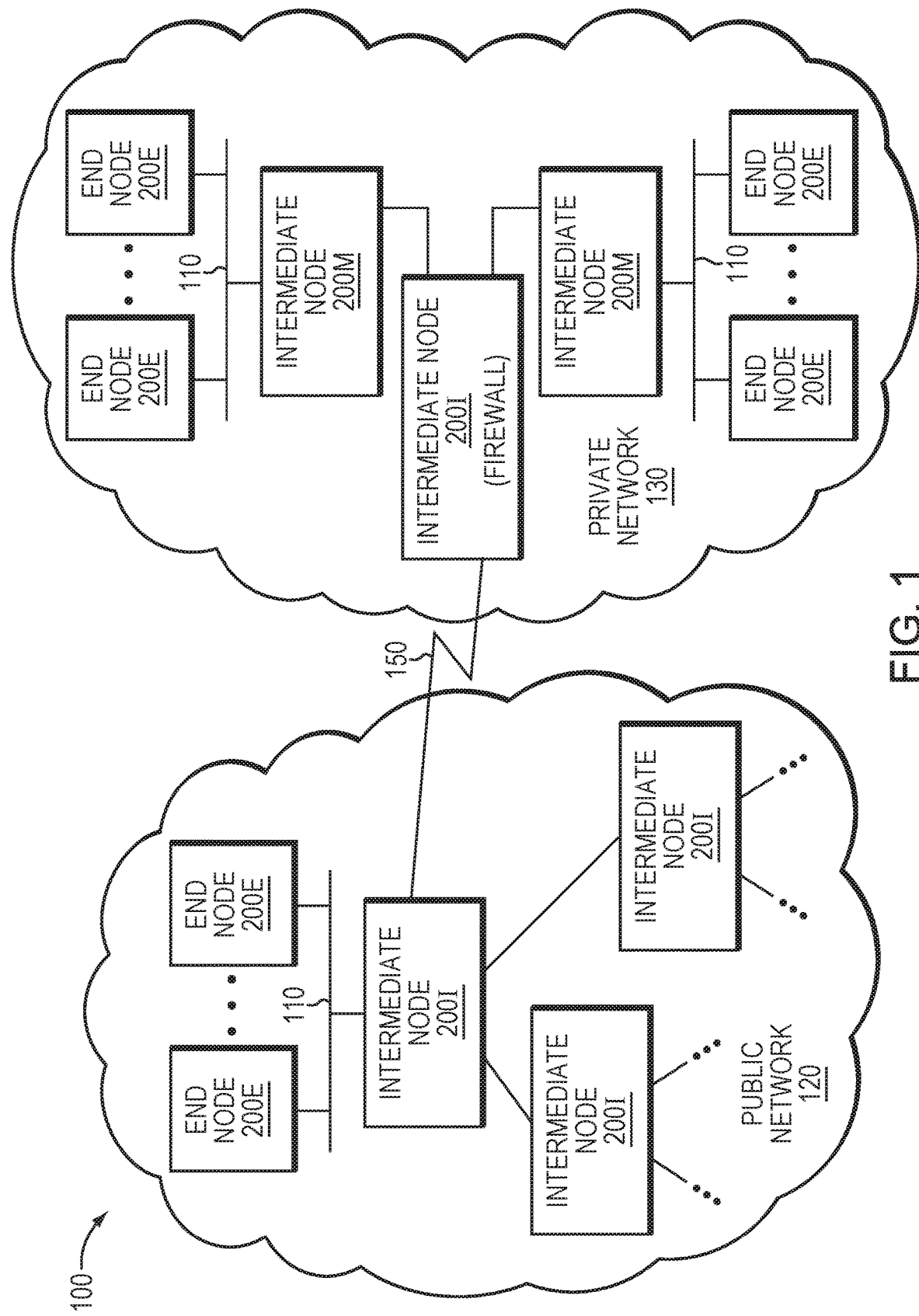
FIG. 1 is a block diagram of a network environment that may be advantageously used with one or more embodiments described herein.

The embodiments described herein provide a technique for establishing secure communication between processes of a guest operating system and a virtualization layer of a virtualization architecture executing on a node of a network environment. The virtualization layer may include a user mode portion having hyper-processes and a kernel portion having a micro-hypervisor (i.e., a type of hypervisor operating at a highest privilege level of a physical processor of the node) that cooperate to virtualize the guest operating system within a virtual machine (VM) and to make hardware resources of the node available for use by the guest operating system, either as pass-through resources, emulated resources or a combination thereof. Secure communication is established between a hyper-process of the virtualization layer (i.e., host) and an agent process in the guest operating system (i.e., guest) using a virtual communication device which, in an embodiment, is implemented as shared memory having two memory buffers. Illustratively, a guest-to-host (G2H) buffer is used as a first message box configured to provide unidirectional communication from the agent to the hyper-process of the virtualization layer and a host-to-guest (H2G) buffer is used as a second message box configured to provide unidirectional communication from the hyper-process to the agent. The buffers cooperate to transform the virtual device into a low-latency, high-bandwidth communication interface configured for bi-directional transfer of information between the agent process and the hyper-process, wherein the communication interface also includes a signaling (doorbell) mechanism configured to notify any of the processes (i.e., the agent or hyper-process) that information is available for transfer over the interface.

During initialization, the agent searches for the communication interface by issuing a probe request embodied as a hyper-call having an instruction that causes a VM exit from the virtual machine to the virtualization layer. The probe request also includes an interrupt vector allocated to the agent in the guest operating system. According to the secure communication technique, the interrupt vector is used as a virtual interrupt by the virtualization layer for the H2G doorbell notification to preempt regular execution and invoke an interrupt handler of the agent. Additionally, the interrupt handler may be used to guarantee execution time for the agent in the guest operating system. Upon determining that the probe request originates from an authentic agent, the virtualization layer may respond by exchanging device-specific information about the communication interface with the agent; otherwise the probe request fails in a manner that does not reveal the presence of the interface. A backing store (e.g., memory) for the buffers is provided by the virtualization layer, such that the agent is the only in-guest process aware of the existence of the buffers. That is, the buffers are hidden from the guest operating system by the virtualization layer, which ensures that the guest operating system does not page out (swap) the buffers to disk or modify them in any way. Notably, the agent may select an unused (i.e., conflict-free) address range in a guest-physical address space of the virtual machine where the buffers provided by the virtualization layer appear. Moreover, the virtualization layer may protect (e.g., restrict access permission to) the buffers of the communication interface, e.g., against misuse, by ensuring that the communication interface is only visible when the agent is active (running) and is otherwise inaccessible to the guest operating system and to direct memory access (DMA) operations from input/output (I/O) devices.

In an embodiment, a request/response messaging protocol may be established across the G2H and H2G buffers to enable bi-directional transfer of information between the agent and the virtualization layer. For example, to transfer information to the virtualization layer, the agent loads a request having one or more messages along with an identifier (ID) generated by the agent (e.g., ID X) into the G2H buffer and notifies the virtualization layer by issuing a central processing unit (CPU) instruction (e.g., VMCALL) in the virtual machine that causes a VM exit to the virtualization layer. The CPU instruction acts as a G2H doorbell to notify the virtualization layer that new messages are present in the G2H buffer. Subsequently, the virtualization layer loads a response with the ID of the request (e.g., ID X) into the H2G buffer. Using the request and response IDs in the respective buffers, the agent can determine which response belongs to which request. Likewise to transfer information to the agent, the virtualization layer loads a request having one or messages along with an ID generated by the hyper-process (e.g., ID Y) into the H2G buffer and notifies the agent by injecting (issuing) the virtual interrupt into the guest operating system. The virtual interrupt acts as a H2G doorbell to notify the agent that one or more new messages are present in the H2G buffer. In response (at a later point in time), the agent loads an answer to the message (i.e., a response) with the ID of the request (e.g., ID Y) into the G2H buffer. Again, by matching request and response IDs, the virtualization layer can determine which response belongs to which request.

Advantageously, the technique provides a high-bandwidth, low-latency communication interface between the agent and virtualization layer that is secure and hidden from the guest operating system. The secure communication interface may be used with any messaging protocol to exchange messages for a variety of implementations including disk and network accesses, the latter of which may involve downloading of policy files from the network through the guest operating system and into the virtualization layer. In addition, the interface may be used for secure communication between the agent and the virtualization layer regarding guest process protection, including notifications for processes being created and destroyed, as well as exploit detection events or other alerts. Furthermore, the interface may be used for secure communication between the agent and the virtualization layer through issuance of requests and responses in arbitrary order, including out-of-order. That is, upon receiving a request, the receiving process can either issue a response immediately (synchronously) or at some later point in time (asynchronously).

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes 200₁ to form an internetwork of nodes, wherein the intermediate nodes 200₁ may include network switches, routers and/or one or more malware detection system (MDS) appliances (intermediate node 200_M). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes 200_E which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that additional protocols, such as the HyperText Transfer Protocol Secure (HTTPS), may be advantageously used with the embodiments herein. In the case of private network 130, the intermediate node 200₁ may include a firewall or other network device configured to limit or block certain network traffic in an attempt to protect the endpoints from unauthorized users. Unfortunately, such conventional attempts often fail to protect the endpoints, which may be compromised.

Figure 2:
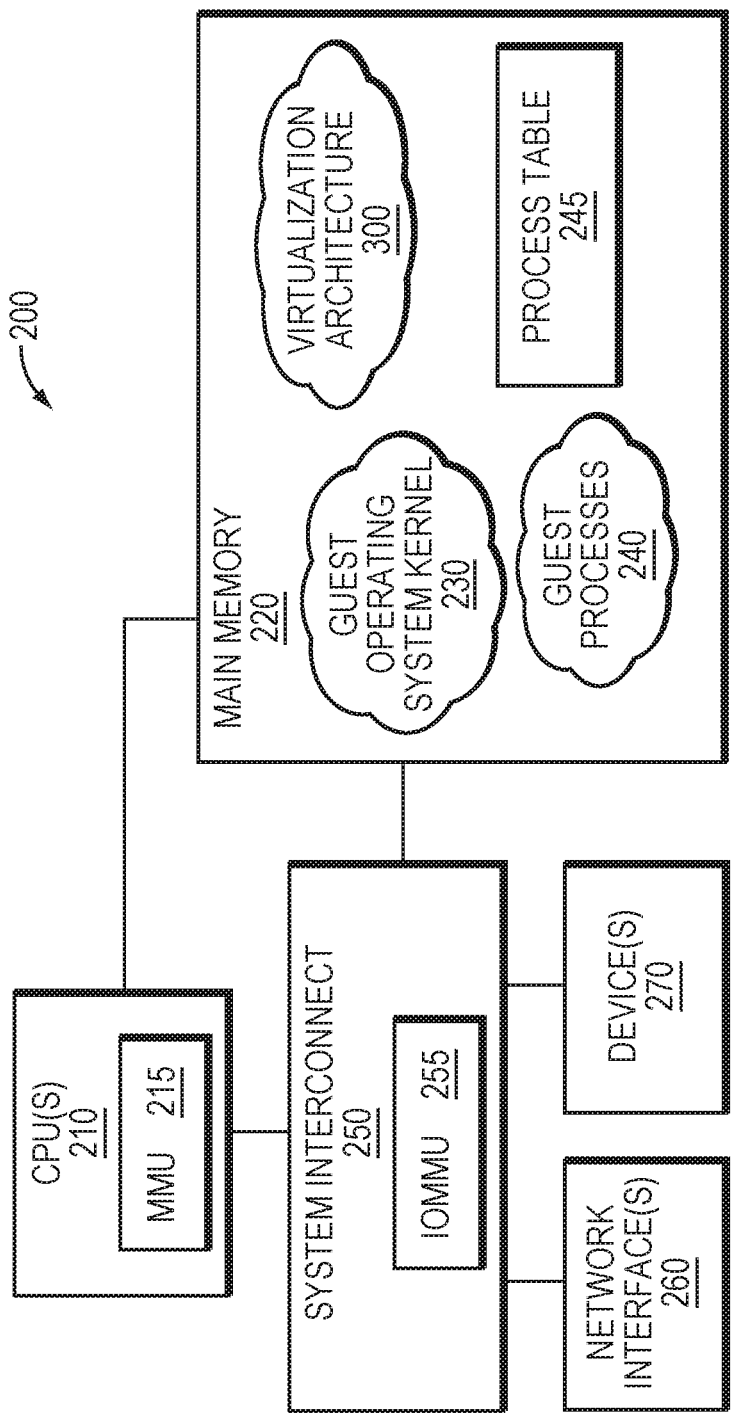
FIG. 2 is a block diagram of a node that may be advantageously used with one or more embodiments described herein.

FIG. 2 is a block diagram of a node 200, e.g., end node $200_E$ or MDS appliance $200_M$, that may be advantageously used with one or more embodiments described herein. The node 200 illustratively includes one or more central processing unit (CPUs) 210 each having one or more CPU cores (not shown), a main memory 220, one or more network interfaces 260 and one or more devices 270 connected by a system interconnect 250. The devices 270 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 260 may include one or more network ports containing the mechanical, electrical and/or signaling circuitry needed to connect the node to the network 130 to thereby facilitate communication over the network. To that end, the network interface 260 may be configured to transmit and/or receive messages using a variety of communication protocols including, inter alia, TCP/IP and HTTPS.

The memory 220 may include a plurality of locations that are addressable by the CPU(s) 210 via a memory management unit (MMU 215), as well as the network interface(s) 260 and device(s) 270 via an I/O MMU (IOMMU 255). Note that accesses to/from memory 220 by the CPU(s) 210 may occur directly through the MMU 215 and over the system interconnect 250, whereas accesses to/from the memory by the network interface(s) 260 and device(s) 270 may occur directly through the IOMMU 255 of the system interconnect. That is, a first data path may occur directly from the CPU to the memory 220 via the system interconnect 250 and a second (independent) data path may occur directly from the I/O devices 270 to the memory 220 also via the system interconnect 250. The memory locations may be configured to store software program code (including application programs) and data structures associated with the embodiments described herein. The CPU 210 may include processing elements or logic adapted to execute the software program code, such as modules of a virtualization architecture 300, and manipulate the data structures, such as a process table 245. Exemplary CPUs may include families of instruction set architectures based on the x86 CPU from Intel Corporation of Santa Clara, Calif., the x64 CPU from Advanced Micro Devices of Sunnyvale, Calif., and the ARM CPU from ARM Holdings, plc of the United Kingdom.

A (guest) operating system kernel 230, portions of which are typically resident in memory 220 and executed by the CPU, functionally organizes the node by, inter alia, invoking operations in support of the software program code and application programs executing on the node. A suitable guest operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be executed as guest processes 240 of the kernel 230. As used herein, a process (e.g., a guest process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer applications or programs stored in memory, alternative embodiments may also include the code, processes and programs being embodied as components, logic, and/or modules consisting of hardware, software, firmware, or combinations thereof.

Virtualization Architecture

Figure 3:
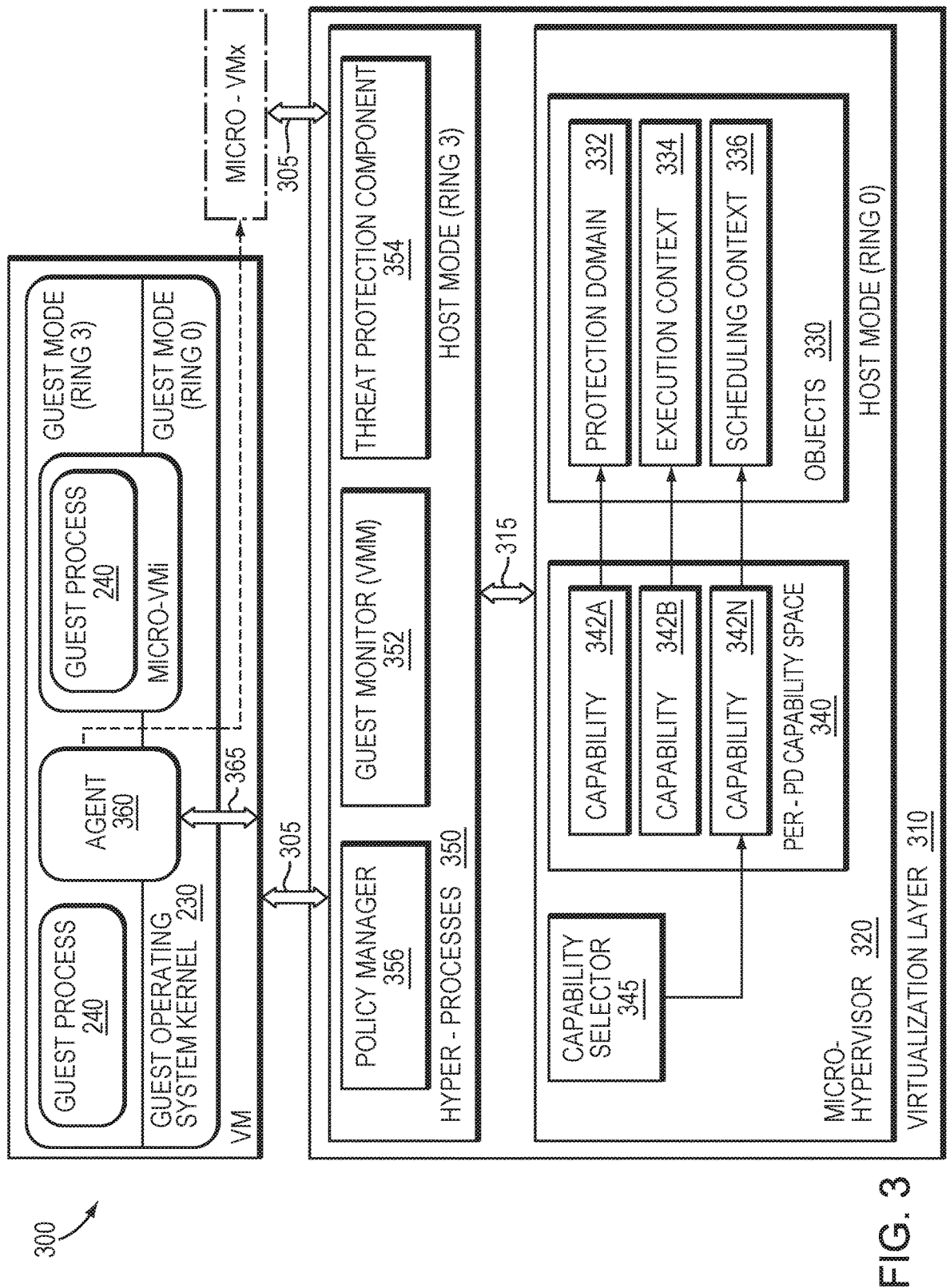
FIG. 3 is a block diagram of a virtualization architecture including a virtualization layer that may be advantageously used with one or more embodiments described herein.

FIG. 3 is a block diagram of a virtualization architecture 300 including a virtualization layer 310 that may be advantageously used with one or more embodiments described herein. The virtualization architecture 300 described herein is illustratively deployed in node 200 embodied as endpoint $200_E$ although the architecture may be further extended for deployment in an appliance, such as MDS appliance $200_M$. The virtualization architecture 300 illustratively includes two privilege modes: guest mode and host mode. In an embodiment, a guest operating system (O/S) runs in the guest mode within a virtual machine, e.g., VM. The guest mode may employ a first set of four protection rings, e.g., guest mode rings 0-3, wherein one or more guest applications (guest processes 240) run in guest mode ring 3 at a lowest guest mode privilege level, and the guest operating system (guest operating system kernel 230) runs in guest mode ring 0 at a highest guest mode privilege level. The virtualization layer 310 operates in host mode of the virtualization architecture, which includes a second set of four protection rings, e.g., host mode rings 0-3. Illustratively, various user mode components embodied as hyper-processes 350 of the virtualization layer 310 run in host mode ring 3 at a lowest host mode privilege level, and a kernel portion (i.e., micro-hypervisor 320) of the virtualization layer runs in host mode ring 0 at a highest host mode privilege level.

The micro-hypervisor 320 (i.e., a type of hypervisor operating at a highest privilege level of a physical processor of the node) may be embodied as a light-weight module configured to facilitate run-time security analysis, including exploit and malware detection and threat intelligence, of the guest processes 240 executing on the node 200. As described herein, the micro-hypervisor 320 may cooperate with corresponding hyper-processes 350 of the virtualization layer 310 to virtualize the hardware and control privileges (i.e., access control permissions) to hardware resources of the node that are typically controlled by the guest operating system kernel. Illustratively, the hardware resources may include (physical) CPU(s) 210, memory 220, network interface(s) 260, and devices 270. The micro-hypervisor 320 may be configured to control access to one or more of the resources in response to a request by a guest process 240 to access the resource.

A user mode portion of the virtualization layer 310 includes the hyper-processes 350, examples of which include, inter alia, a guest monitor 352, a threat protection component 354, and a policy manager 356. The guest monitor 352 is illustratively a unique virtual machine monitor (VMM), i.e., a type 0 VMM, which includes virtualization functionality that cooperates with the micro-hypervisor 320 to virtualize the guest operating system within the VM and run one or more micro-virtual machines (micro-VMs). Accordingly, the guest monitor 352 may include computer executable instructions executed by the CPU 210 to perform operations that spawn, configure, and control/implement the VM or any of a plurality of micro-VMs. The guest monitor 352 may further include virtualization functionality that emulates privileged instructions (i.e., an instruction emulator) and devices (i.e., a virtual device emulator) that act as software substitutes for hardware devices not directly assigned to the guest operating system. As such, a set of hardware resources may be virtualized among a plurality of micro-VMs that may access those resources. That is, the guest monitor 352 may create virtual devices (e.g., software state machines) of the hardware resources for use by the micro-VMs that, from the perspective of the guest operating system, appear as physical resources.

As used herein, the term "micro" VM denotes a virtual machine serving as a container that may be restricted to a single guest process (as opposed to the VM which is spawned as a container for the entire guest operating system having many guest processes). In one embodiment, the micro-VMx may be implemented outside of the VM, (i.e., in a separate protection domain) using, e.g., copy-on-write semantics. In another embodiment, the micro-VMi may be implemented inside the VM (i.e., inside a same protection domain as the VM) using, e.g., one or more memory views as described further herein. However, whereas a micro-VM may be restricted to a single guest process, the hardware resources used by that micro-VM, such as memory, may be accessed by a plurality of micro-VMs (and their respective guest processes). As noted, there is only one virtual machine (e.g., VM) per guest operating system on the endpoint. Typically, the guest operating system running in the VM has one "view" of the memory 220, i.e., "guest-physical" memory, corresponding to one nested page table, as described further herein. Accordingly, as described herein, a same nested page table (i.e., memory view) may be used by a plurality of guest processes, each contained in a separate corresponding micro-VM that uses the same nested page table. However, additional views of memory may be created for each guest process, wherein every view corresponds to a different (i.e., separate) nested page table. Thus, different guest processes may view the guest-physical memory differently (e.g., with different translations or different permissions to the host-physical memory).

In an embodiment, the micro-VM may be implemented as such a view (i.e., a guest-physical memory view) of the memory 220, i.e., controlling the host-physical memory (hardware resource) underlying the guest-physical view of memory. Notably, different guest processes 240 may run in different micro-VMs, each of which is controlled by the (same) guest monitor 352 (also controlling the VM) to thereby enable a global view of execution activity in the guest operating system. The micro-VM thus has properties similar to the typical VM, but with less overhead, i.e., no additional guest monitors. In terms of execution, operation of the guest process is controlled and synchronized by the guest operating system kernel 230; however, in terms of access to hardware resources (managed in host mode), operation of the process is controlled by the guest monitor 352. Access to hardware resources may be synchronized among the micro-VMs and the VM by the guest monitor 352 rather than virtually shared. Notably, certain types of hardware resources, such as memory, may not need express synchronization among micro-VMs. For example, each CPU core may have a single memory view (i.e., set of nested page tables) active at a time, so that express synchronization among memory views is unnecessary. As such, memory views may be assigned to multiple micro-VMs with implicit synchronization.

In an embodiment, the privileged interfaces 305 and 315 may be embodied as a set of defined hyper-calls, each of which is an operation that explicitly calls (explicit transition) into the micro-hypervisor. The hyper-calls may originate from one or more hyper-processes 350 of the virtualization layer 310 and are directed to the micro-hypervisor 320 over the privileged interface 315 alternatively, bi-directional communications may originate from a protected component (e.g., an agent) in the guest operating system directed to the micro-hypervisor (virtualization layer) over the privileged interface 305. A transition from the guest operating system to the virtualization layer 310 is called a VM exit. Such a transition may be implicit, e.g., an intercepted operation or page-protection violation, or explicit, such as a VMCALL instruction from guest mode to host mode. Further, as used herein, an inter-process communication (IPC) message between two hyper-processes requires two hyper-calls (i.e., one for each process) for bi-directional communication.

The policy manager 356 may contain computer executable instructions executed by the CPU 210 to perform operations that associate a protection policy with each guest process 240. The threat protection component 354 may include instrumentation logic implemented as heuristics configured to determine the presence of an exploit or malware in any suspicious guest operating system process (kernel or user mode). To that end, the threat protection component 354 may include software program code (e.g., executable machine code) in the form of instrumentation logic (including decision logic) configured to analyze one or more interception points originated by one or more guest processes 240 to invoke the services, e.g., accesses to the hardware resources, of the guest operating system kernel 230. Illustratively, the threat protection component 354 may contain computer executable instructions executed by the CPU 210 to perform operations that initialize and implement the instrumentation logic.

As used herein, an interception point is a point in an instruction stream where control passes to (e.g., is intercepted by) the virtualization layer 310, e.g., the micro-hypervisor 320. Illustratively, the micro-hypervisor can intercept execution inside the guest operating system at arbitrary points such as (i) inside any guest process, (ii) inside the guest operating system kernel, and/or (iii) on transitions between guest processes and the guest operating system kernel. Malicious behavior may then be analyzed by the virtualization layer (e.g., the threat protection component 354), wherein the behavior may occur anywhere in the guest operating system, including in any guest process or in the guest operating system kernel. The virtualization layer 310 may, thus, place interception points at appropriate instruction stream points, whether in a process or in the kernel.

The guest operating system kernel 230 may be configured to include an operating system (OS) specific extension or agent 360 adapted to communicate with the threat protection component 354. The agent 360 illustratively contains executable machine code in the form of logic configured to provide an interface to the threat protection component 354 that allows introspection (examination and/or interception) of contents of internal structures of the guest operating system kernel 230, as well as semantic context associated with such contents. Such virtual machine introspection (VMI) may involve examination of data structures of the guest operating system kernel 230 in a manner that obviates duplication of (i.e., without copying) those structures between the guest and host modes of the virtualization architecture. To that end, the agent 360 may run in host mode ring 3, guest mode ring 0 or guest mode ring 3; however, in an embodiment described herein, the agent 360 illustratively runs in guest mode ring 0 (as a kernel mode driver) and guest mode ring 3 (as a user mode application). Accordingly, the agent 360 may contain computer executable instructions executed by the CPU 210 to perform operations that implement communication with, and introspection by, the threat protection component 354. For example, identification (ID) of each guest process 240 running in the guest operating system may be obtained from process IDs stored in a data structure, e.g., the process table 245, of the guest operating system kernel 230. Instead of having to duplicate that data structure and its contents to the host mode, the threat protection component 354 can instruct the agent to examine the process table 245 and provide the ID of the guest process 240. That is, the agent 360 operating in the guest mode may act on behalf callers (e.g., guest monitor 352) operating in the host mode to access data structures in the guest mode. Alternatively, the threat protection component may examine directly the memory used by the guest O/S (i.e., virtual machine introspection) to determine locations (and layout) of the process table 245 so as to determine the ID of the guest process 240. Illustratively, threat protection component 354 may communicate with the guest operating system kernel 230 (i.e., the agent 360) over a defined application programming interface (API) 365.

As a light-weight module, the micro-hypervisor 320 may provide a virtualization layer having less functionality than a typical hypervisor. Therefore, as used herein, the micro-hypervisor 320 is a module that is disposed or layered beneath (underlying, i.e., directly on native hardware and operating at a highest privilege level of that native hardware) the guest operating system kernel 230 and includes the functionality of a micro-kernel (e.g., protection domains, execution contexts, capabilities and scheduling), as well as a subset of the functionality of a hypervisor (e.g., management of virtual CPUs and their states, management of the MMU, IOMMU and other security-critical devices, as well as hyper-calls to implement a virtual machine monitor). Accordingly, the micro-hypervisor 320 may cooperate with the guest monitor 352 to provide additional virtualization functionality in an operationally and resource efficient manner. Unlike a type 1 or type 2 VMM (hypervisor), the guest monitor 352 is illustratively a type 0 VMM (VMM 0) that does not fully virtualize the hardware resources of the node 200, while supporting execution of one entire operating system/instance inside one virtual machine, i.e., the VM. The guest monitor 352 may thus instantiate the VM as a container for the guest processes 240, as well as the guest operating system kernel 230 and its hardware resources. Illustratively, the guest monitor 352 is a pass-through module configured to expose the hardware resources of the node (as controlled by the micro-hypervisor) to the guest operating system kernel 230. Yet, virtualization processing in response to a VM exit (and a resulting transition of control flow from the guest operating system to the micro-hypervisor) may be performed by the guest monitor. To that end, the micro-hypervisor 320 may enable communication between the guest operating system (i.e., the VM) and the guest monitor over privileged interfaces 305 and 315.

In an embodiment, the micro-hypervisor 320 may include a plurality of data structures, such as objects 330 and capabilities 342, configured to provide security and isolation features associated with the virtualization architecture 300. Illustratively, the objects 330 include one or more protection domains 332, execution contexts 334 and scheduling contexts 336. As used herein, a protection domain 332 is a kernel mode object that implements spatial isolation among the hyper-processes of the virtualization layer and includes a representation of a security privilege associated with each hyper-process 350 that is enforced by the micro-hypervisor 320. Illustratively, each hyper-process 350 in the virtualization layer 310 runs in a separate protection domain 332. An execution context 334 is illustratively a representation of a thread associated with the hyper-process 350 and, to that end, defines a state of the thread for execution on the CPU 210. In an embodiment, the execution context 334 may include inter alia (i) contents of CPU registers, (ii) pointers/values on a stack, (iii) a program counter, and/or (iv) allocation of memory via, e.g., memory pages. The execution context 334 is thus a static view of the state of thread and, therefore, its associated hyper-process 350. For the thread to execute on a CPU, its execution context is tightly linked to a scheduling context 336, which may be configured to provide information for scheduling the execution context 334 for execution on the CPU 210. Illustratively, the scheduling context information may include a priority and a quantum time for execution of its linked execution context on CPU 210.

The micro-hypervisor 320 also includes a per-protection domain (PD) capability space 340 that contains capabilities 342A-N, wherein each capability 342 is a pointer to an object 330 having associated permissions (i.e., privileges). Hyper-processes 350 of the virtualization layer 310 do not have the ability to work with the capabilities 342 directly, i.e., they cannot read the pointer or privileges directly and can only refer to those capabilities using a capability selector 345, e.g., an integral number. To invoke a specific capability, a hyper-process 350, such as the guest monitor 352, may issue a hyper-call request (e.g., over interface 315) to the micro-hypervisor 320, wherein the request includes an action (e.g., "send a message" or "delegate a capability") along with a corresponding capability selector, i.e., an index such as N, that identifies (names) the object 330 involved in the hyper-call. Illustratively, the capabilities 342 are used to name the object on which the hyper-call operates and, at the same time, convey the access permissions of the calling hyper-process on that object. In response to the request, the micro-hypervisor may access the per-PD capability space 340 to select the requested capability 342N, which names (e.g., points to) the object (e.g., scheduling context 336) on which the action is performed.

Illustratively, a capability 342 is a concept that is only known in the virtualization layer 310, i.e., the guest operating system is unaware of the capability. The capability 342 is essentially a mechanism to enforce security privileges among the hyper-processes 350 of the virtualization layer 310. Notably, each hyper-process 350 is provided only a minimal set of capabilities 342 necessary for that component to perform its assigned function. For example, the guest monitor 352 may have the capability to access the VM, while only the threat protection component 354 may have the capability to communicate with the guest monitor 352 and policy manager 356. Thus, an attacker that is able to compromise a hyper-process (protection domain 332) would only be able to inflict damage associated with the capabilities 342 held by that protection domain 332.

As described herein, certain events or activities, e.g., attempted access to hardware resources, of a guest process 240 may be treated as interception points that allow the virtualization layer 310 to further monitor or instrument the process using a spawned micro-VM. A system call is an example of an interception point at which a change in privilege modes or levels occurs in the guest operating system, i.e., from guest mode ring 3 (a lowest level of guest mode privilege) of the guest process 240 to guest mode ring 0 (a highest mode of guest mode privilege) of the guest operating system kernel 230. The guest monitor 352 may intercept the system call and examine a state of the process issuing (sending) the call. The instrumentation logic of threat protection component 354 may analyze the system call to determine whether the call is suspicious and, if so, instruct the guest monitor 352 to instantiate (spawn) one or more micro-VMs, managed by the guest monitor in cooperation with the threat protection component, to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Memory Virtualization

Figure 4:
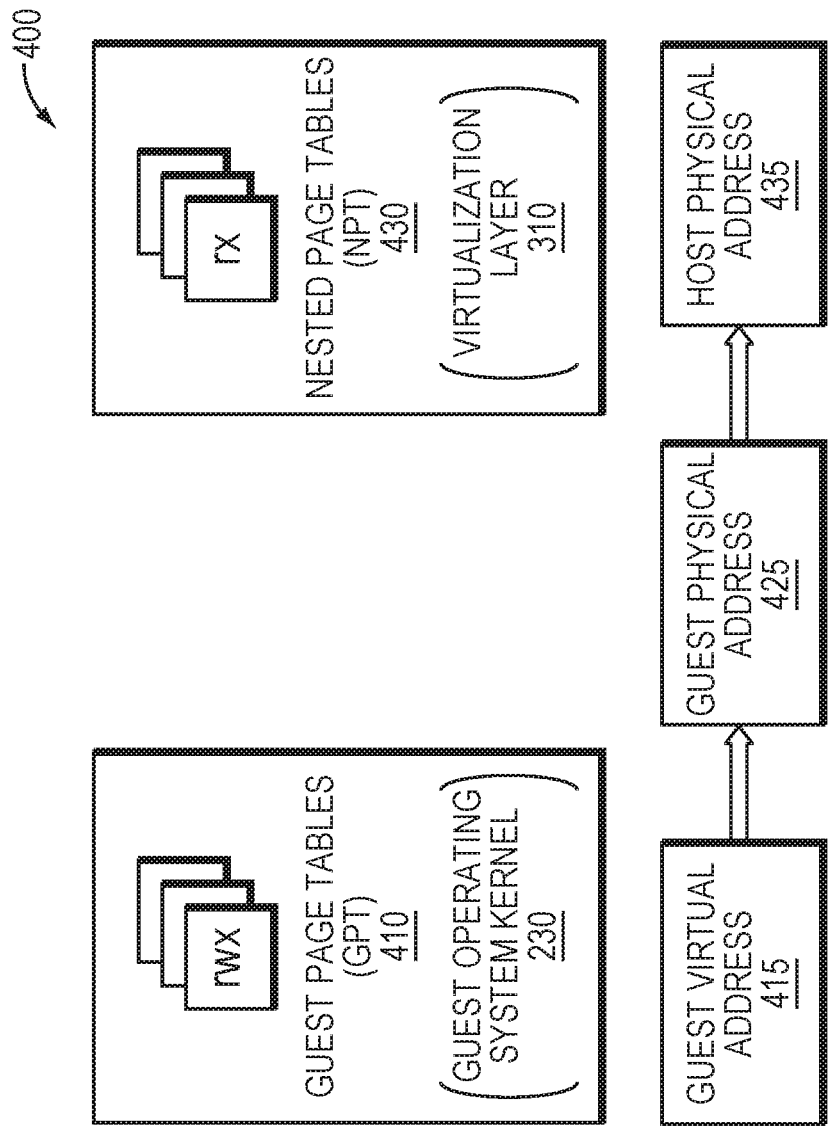
FIG. 4 is a block diagram illustrating memory virtualization that may be advantageously used with one or more embodiments described herein.

FIG. 4 is a block diagram illustrating memory virtualization 400 that may be advantageously used with one or more embodiments described herein. The guest operating system kernel 230 may create one or more sets of guest page tables (GPT) 410, wherein there is typically one set of guest page tables per guest process 240 that perform a first translation from a guest virtual (linear) address 415 to a guest-physical address 425. Each guest process 240 typically runs in its own address space of guest-virtual addresses; to that end, the guest operating system kernel 230 creates one or more guest page tables 410, e.g., in the form of a guest page table hierarchy, associated with the address space of the guest process 240. When switching guest processes for execution on the CPU 210 during a context switch, the guest operating system kernel 230 swaps a prior guest page table hierarchy (of a prior process) for the guest page table hierarchy of the (current) process to be executed.

Virtualization provides one or more additional page tables, i.e., nested page tables (NPT) 430, layered underneath (i.e., nested with) the GPT 410. The nested page tables 430 may be utilized to perform a second translation from the guest-physical address 425 to a host-physical address 435, wherein the host-physical address 435 is an address used to access (physical) main memory 220. The translation of guest-physical address 425 to host-physical address 435 may be flexible, i.e., such translation may be implemented on a per page basis to determine how each guest-physical address 425 is translated to a host-physical address 435. Illustratively, translation from guest-physical addresses to host-physical addresses is controlled by the virtualization layer 310 to establish a mapping from the guest-physical addresses used in a VM (e.g., the VM) to a host-physical address in main memory 220.

In an embodiment, guest page tables 410 are part of a guest page table hierarchy that is controlled by the guest operating system kernel 230, and the nested page tables 430 are part of a nested page table hierarchy that is controlled by the virtualization layer 310, e.g., managed by the micro-hypervisor 320 in cooperation with the guest monitor 352. In one arrangement where the MMU hardware supports nested paging, the page table hierarchies may be organized as a two-stage (i.e., layered) translation arrangement of the (physical) MMU 215 (supporting a virtualized MMU via two-level page table hierarchies), where the page tables define the translation of a guest-virtual address 415 to a guest-physical address 425 (a first stage defined by the GPT) and, ultimately, to a host-physical address 435 (a second stage defined by the NPT). There, the guest operating system kernel 230 manages the guest page tables 410, the virtualization layer 310 manages the nested page tables 430, and the nested page tables are consulted by the MMU after the guest page tables. Hence, the nested page tables may be used to override permissions.

In an alternative arrangement where the MMU hardware does not support nested paging (e.g., it can only perform one-level translation), the guest page tables may be organized as a shadow page table arrangement synchronized with the nested page table hierarchy such that the shadow page tables provide guest-virtual address to host-physical address translations that are updated (i.e., synchronized) with changes to the guest page table hierarchy or nested page table hierarchy. The virtualization layer 310 is responsible for folding the guest page tables 410 (managed by the guest operating system kernel 230) and the nested page tables 430 (managed by the virtualization layer) together to create the shadow page tables so as to perform end-to-end translation from guest-virtual addresses to host-physical addresses. The MMU 215 then uses the shadow page tables for translating guest-virtual addresses to host-physical addresses as a single level translation. Accordingly, the shadow page tables are updated when the guest page tables or nested page tables change. It should be noted that either arrangement may provide additional functionality, wherein each translation stage may define access permissions on a page granularity. That is, for each page referenced by a page table, access permissions may be specified as to whether the page is readable (r) writeable (w), or executable (x).

In an embodiment, the "ultra" (ultimate) translation to physical memory of the two-stage arrangement, i.e., the translation from guest-physical address 425 to host-physical address 435, may be employed to overwrite any page permissions that the guest operating system kernel 230 has defined. For example, assume the guest operating system kernel 230 has defined, using the GPT, a certain read (r), write (w), execute (x) mapping for a guest-virtual address 415 to guest-physical address 425 of a page accessible by a guest process 240, so that the guest process 240 may expect that it can actually read, write and execute that page. Yet, using the nested page tables 430 (i.e., layered beneath the GPT), the virtualization layer 310 may alter or change those permissions to be write protected, i.e., read-only (r) and execute (x) with no write permission, for the actual (host) physical page that the guest operating system kernel 230 (and guest process 240) may attempt to access. Therefore, any time that the guest process 240 attempts a write access to the page, an access violation of the nested page tables occurs, resulting in a VM exit (e.g., a transition) that returns control to the virtualization layer 310. Note that for the shadow page table arrangement, the violation occurs for a shadow page acting as a condensed two-stage address translation. In response to determining that the attempted write access is to a physical page that is write protected, the virtualization layer 310 may take action, such as emulating the access, making the page writeable, shadow copying the write, or completely nullifying the effects of that access. As another example, assume the guest operating system kernel 230 has marked the page as non-executable. The virtualization layer 310 may render the page executable or emulate the instruction that would have been executed if the page had been executed.

Memory Views

As noted, the micro-VM may be implemented as a view of the memory 220 (memory view) embodied as nested page table address mappings that control the host-physical memory underlying the guest-physical view of memory. Accordingly, the memory view is a hardware resource (i.e., a set of NPT tables) used by the micro-VM as a container (i.e., constraining access to memory) for one or more guest processes. The address space of each guest process 240 may be represented by the combination of the GPT and a memory view (e.g., NPT address mappings). Different guest processes 240 may run in different memory views, each of which is controlled by the guest monitor 352 associated with the VM to thereby enable a global view of execution activity in the guest operating system. In an embodiment, each memory view may have its own nested page table hierarchy that describes the guest-physical memory layout of the view (i.e., micro-VM); accordingly, the VM may implement one or more micro-VMs as memory views through different NPTs 430 of the nested page table hierarchies. A protection profile of each guest process defines in which memory view (micro-VM) that guest process runs. The guest operating system kernel 230 and hardware resources may then be mapped into the memory views to ensure synchronization when accessing the guest operating system kernel and resources.

Figure 5:
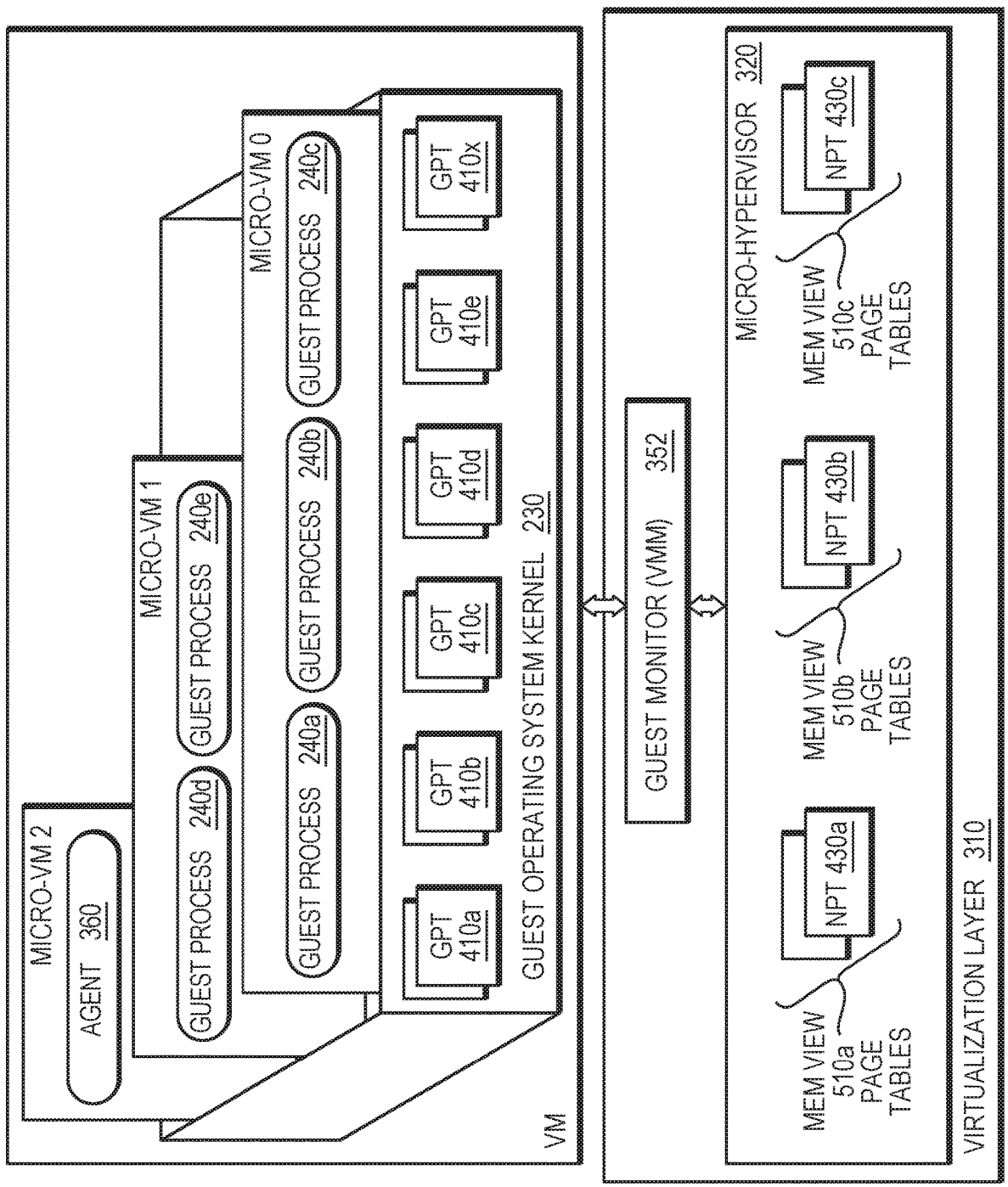
FIG. 5 is a block diagram illustrating one or more memory views that may be advantageously used with one or more embodiments described herein.

FIG. 5 is a block diagram illustrating one or more memory views that may be advantageously used with one or more embodiments described herein. In an embodiment, each guest process 240 runs in a micro-VM that encompasses an address space associated with a set of GPTs 410 of a guest page table hierarchy as controlled by the guest operating system kernel 230. For example, guest processes 240a,b,c run in micro-VM 0, wherein each guest process 240a,b,c has an address space associated with GPTs 410a,b,c, respectively. Similarly, guest processes 240d,e run in micro-VM 1, wherein each guest process 240d,e has an address space associated with GPTs 410d,e, respectively, and agent 360 runs in a micro-VM 2 having an address space associated with GPTs 410x. Moreover, each micro-VM may be implemented in the micro-hypervisor as a memory view 510 having an associated nested page table hierarchy.

Illustratively, each memory view 510 has its own set of NPTs 430 of a nested page table hierarchy associated with a micro-VM that describes the guest-physical memory layout of that view as controlled by the virtualization layer 310, e.g., managed by micro-hypervisor 320 in cooperation with the guest monitor 352. For example, memory view 510a has NPTs 430a associated with micro-VM 0, memory view 510b has NPTs 430b associated with micro-VM 1, and memory view 510c has NPTs 430c associated with micro-VM 2. As such, the VM may include one or more micro-VMs each having different nested page table hierarchies. Accordingly, one or more guest processes 240 along with the guest operating system kernel 230 run in a micro-VM, i.e., guest processes 240a,b,c and guest O/S kernel 230 run in micro-VM 0, guest processes 240d,e and guest O/S kernel 230 run in micro-VM 1, and agent 360 and guest O/S kernel 230 run in micro-VM 2.

When the guest operating system kernel 230 switches from one guest process 240 to another, the guest monitor 352 (VMM) observes the guest process switch and, in response, swaps (switches) to the NPT 430 that implements the memory view to which the switched process is assigned. Thus, if the guest monitor 352 observes a guest process switch from guest process 240a to guest process 240c (or from guest process 240d to guest process 240e), no NPT switching occurs and the memory view remains unchanged. However, in response to observing a guest process switch from guest process 240c to guest process 240e, the guest monitor 352 switches from NPT 430a to NPT 430b. Likewise, in response to observing a switch from guest process 240d to the agent 360, the guest monitor switches from NPT 430b to NPT 430c. Because the guest operating system kernel 230 is mapped in all nested page table hierarchies, a change from one memory view (micro-VM) to another does not change the state of the guest operating system kernel, i.e., it appears as if the guest operating system kernel 230 "moves" from one memory view to another.

Advantageously, the assignment of guest processes to memory views (micro-VMs) is flexible and efficient. For example, guest processes that belong to a particular (default) protection profile may run in memory view 510a where the entire memory is visible, e.g., in guest mode, and no permissions have been overridden. Certain other guest processes may require a higher degree of protection/monitoring and may be assigned to memory view 510b where the guest monitor 352 may tighten (i.e., restrict) permission to certain memory pages. Likewise, certain trusted processes, such as agent 360, may be assigned to memory view 510c where certain memory pages are visible (i.e., accessible) that are not visible in the other memory views. In sum, one or more guest processes may be assigned to each memory view and a guest process may also be reassigned from one memory view to another.

Secure Communication

The embodiments described herein provide a technique for establishing secure communication between processes of the guest operating system and the virtualization layer of the virtualization architecture. Establishment of secure communication between the virtualization layer and guest operating system may be further extended to interfaces and/or devices coupled to the network because the guest operating system in the VM has pass-through access to all platform (node) devices, except for security-critical devices such as interrupt controllers, the MMU and the IOMMU. Such access obviates the need for the virtualization layer to provide drivers (i.e., emulation) for various hardware devices on the node; instead, drivers of the guest operating system may be used to manage and control the devices directly, which also improves efficiency and performance by eliminating I/O handling in the virtualization layer. As such, the virtualization layer depends on the guest operating system for external communication, e.g., via a network interface 260.

For example, to communicate with an another (i.e., external) node on the network via a network interface, the virtualization layer may pass a message through the guest operating system via an associated network driver to the network interface. Thus, a foothold is required in the guest operating system for the virtualization layer to perform I/O, e.g., access the network, as well as to access any other hardware device on the node, such as a disk or display. From an I/O availability perspective, the virtualization layer 310 is dependent on the guest operating system, e.g., communication with a device may be lost if the guest operating system kernel 230 disables the device or uninstalls its driver. However from either an I/O integrity (correctness) or confidentiality (privacy) perspective, the virtualization layer is not dependent on the guest operating system because the virtualization layer can encrypt content of the information transmitted for communication and include a message authentication code (MAC).

In an embodiment, secure communication may established between a process in the virtualization layer (i.e., host) and a process in the guest operating system (i.e., guest), wherein the virtualization layer process is illustratively the threat protection component 354 and the guest operating system process is illustratively the agent 360. However, the technique described herein may be extended to enable secure communication between any process of the virtualization layer 310 (including the micro-hypervisor 320) and any kernel or user mode process of the guest operating system. According to the technique, secure communication is illustratively established using a virtual communication device which, in an embodiment, is implemented as shared memory, e.g., in main memory 220, having two memory (e.g., ring) buffers. In alternative embodiments, the virtual communication device may be implemented as a bi-directional memory buffer, as well as one or more (i) queues, (ii) first-in first-out (FIFO) buffers, (iii) stacks or other organized forms of memory buffers. Moreover, virtual communication also may be performed completely without memory, e.g., using strictly CPU registers.

Figure 6:
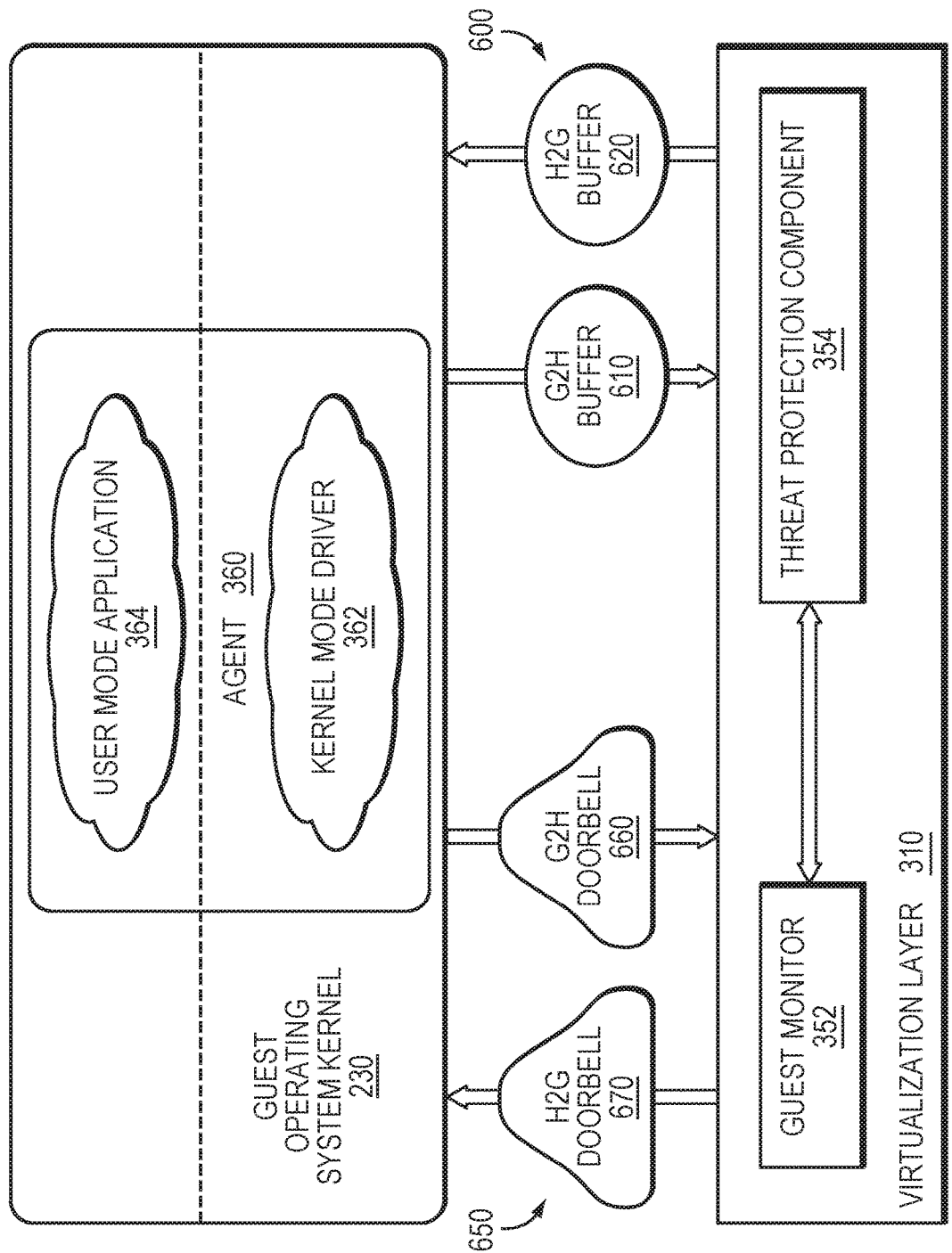
FIG. 6 is a block diagram of a virtual communication device that may be used for secure communication in accordance with one or more embodiments described herein.

FIG. 6 is a block diagram of the virtual communication device that may be used for secure communication in accordance with one or more embodiments described herein. Illustratively, a guest-to-host (G2H) buffer 610 is used as a first message box configured to provide unidirectional communication from the guest (agent 360) to the host (threat protection component 354) and a host-to-guest (H2G) buffer 620 is used as a second message box configured to provide unidirectional communication from the threat protection component 354 (virtualization layer 310) to the agent 360. The buffers cooperate to transform the virtual device into a low-latency, high-bandwidth communication interface 600 configured for bi-directional transfer of information between the agent process 360 and the threat protection component (hyper-process) of the virtualization layer 310, wherein the communication interface 600 also includes a signaling (doorbell) mechanism 650 configured to notify any of the processes (i.e., the agent or hyper-process) that information is available for transfer over the interface. Note that the doorbell may also be used in the case of a full buffer to signal a respective process when buffer space becomes available.

Figure 7:
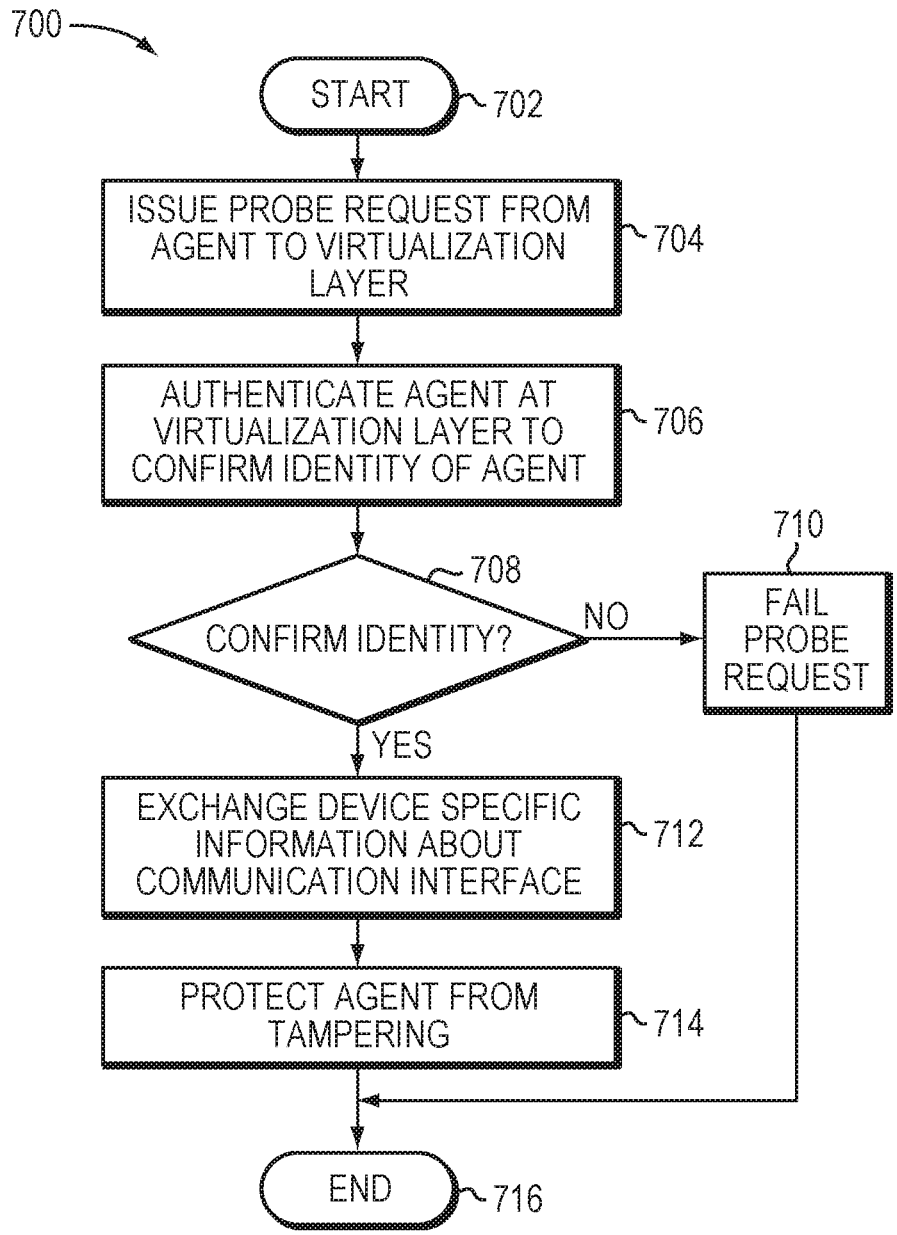
FIG. 7 is an example simplified procedure of an initialization phase of a secure communication technique described herein.

In an embodiment, a messaging protocol between the agent 360 and the virtualization layer 310 includes (i) a request/response phase used for exchange of information and (ii) an initialization (setup) phase that authenticates the agent to the virtualization layer and enables the exchange of information, such as doorbell signaling attributes, by the request/response phase. FIG. 7 is an example simplified procedure of an initialization phase of the secure communication technique described herein. The procedure 700 starts at step 702 and proceeds to step 704 where the agent is configured to search for the communication interface by issuing a probe request to the virtualization layer, wherein the probe request is embodied as a hyper-call that includes an instruction configured to cause a VM exit from the virtual machine to the virtualization layer. Note that a typical process (e.g., a kernel or user mode process) of the guest operating system is not configured to discover (i.e., by probing) the communication interface, because the interface is not exposed (e.g., by the virtualization layer) as a virtual device to the guest operating system, i.e., the communication interface is hidden from a guest operating system. In an embodiment, the instruction is illustratively the x86 CPU architecture CPUID instruction that identifies one or more CPU features, although other instructions that trap to the virtualization layer (e.g., VMCALL) may be used.

According to the technique, the probe request (i.e., the CPUID instruction) is interpreted by the virtualization layer as an identification of the agent and, further, as a probe for the communication interface (i.e., the shared memory buffers). In response to the probe request, the virtualization layer may authenticate the agent to confirm that the instruction is issued by an authentic agent process at step 706. Notably, the virtualization layer (e.g., the threat protection component 354) may authenticate the agent by, e.g., write-protecting the code section (code pages) of the agent process prior to hashing the code pages and confirming its identity, as described in U.S. patent application Ser. No. 15/230,215 filed on Aug. 5, 2016 titled, Technique for Protecting Guest Processes Using a Layered Virtualization Architecture, by Udo Steinberg. If the identity of the agent is not confirmed (step 708), the virtualization layer may treat the caller of the probe request as a typical guest process and may respond by, e.g., by providing a typical response for the probe request (i.e., CPUID instruction), such as returning typical information expected in response to the x86 CPUID instruction. In other words, the probe request fails (step 710) in a manner that does not reveal the presence of the interface (e.g., by generating an undefined opcode exception); accordingly, the virtualization layer does not expose the interface. However, if the identity of the agent is confirmed at step 708, i.e., it is determined that the probe request originates from an authentic agent, the virtualization layer may respond by exchanging device-specific information about the communication interface with the agent at step 712. At step 714, the agent is further protected (e.g., beyond write protection of the code pages) from tampering through the application of, e.g., a protection profile, as described in U.S. patent application Ser. No. 15/230,215 titled, Technique for Protecting Guest Processes Using a Layered Virtualization Architecture. For example, the protection profile may be applied to the agent code to protect all of the code pages of the agent against modification by, e.g., rendering the pages execute-only. The procedure then ends at step 716.

Referring again to FIG. 6, the probe request also includes an interrupt vector associated with (e.g., allocated or registered to) the agent in the guest operating system. In an embodiment, the agent 360 includes a kernel mode driver 362 and a user mode application 364. The kernel mode driver 362 of the agent 360 is illustratively a driver within the guest operating system kernel 230 that controls (drives) the communication interface 600 and that allocates or registers the interrupt vector via the guest operating system to the agent. In another embodiment, the guest operating system kernel 230 manages an interrupt vector table, e.g., an interrupt descriptor table (IDT), and associated interrupt vectors. The kernel mode driver 362 allocates the interrupt vector and an interrupt handler in the guest operating system to the agent 360 (i.e., the kernel mode driver 362 contains the interrupt handler within the guest operating system kernel 230). Illustratively, the interrupt vector is a location (e.g., a guest-physical address) in memory for an entry point of the interrupt handler, which is embodied as an interrupt service routine (ISR) of the agent for handling a virtual interrupt (i.e., an interrupt of the virtual machine) associated with the communication interface. In another embodiment (e.g., x86 CPU architecture), the interrupt vector may represent an index (e.g., 91) into the interrupt vector table to obtain the entry point of the interrupt handler. That is, the interrupt vector may be an indirect reference via the IDT to a location in memory (e.g., a guest-virtual address) for the entry point of the ISR. Illustratively, for the ARM CPU architecture, device interrupts may be funneled through single entry in the IDT, wherein I/O devices are polled to determine a source of the interrupt.

Accordingly, for communication device interrupts (e.g., signaling mechanism 650) the interrupt vector may represent the entry point of the ISR. The ISR may be invoked by issuing (injecting) an interrupt into the virtual machine such that execution is transferred to the ISR (i.e., equivalent to a device interrupt in the virtual machine for the communication interface "device"), which guarantees execution time in the guest operating system irrespective of any guest process scheduling priorities. Illustratively, the agent 360 provides the allocated (or registered) interrupt vector to the virtualization layer as an interrupt handler entry point for a virtual interrupt used as the H2G doorbell notification. That is, the interrupt vector is used by the virtualization layer as a H2G doorbell 670 for the H2G buffer 620 to effect communication with the agent by, e.g., injecting the interrupt vector into the guest operating system kernel 230.

Furthermore, the probe request issued to the virtualization layer includes a guest-physical memory address range to which the agent 360 can request the guest monitor 352 to map the two buffers of the communication interface 600 into its guest-physical address space. As noted, the kernel mode driver 362 of the agent searches (i.e., probes) for the communication interface 600 during the initialization phase. As part of its configuration of a device (e.g., the communication interface), the kernel mode driver 362 selects an address range within an address space of the virtual machine at which to place the (virtual) device in main memory 220. In an embodiment, the main memory 220 of the node (e.g., endpoint 200$_E$) is apportioned into (i) host-physical memory controlled by the virtualization layer 310 and having a host-physical address space and (ii) guest-physical memory controlled by the guest operating system kernel 230 and having a guest-physical address space. The kernel mode driver 362 may choose a location (e.g., an address range) for the shared memory buffers in the guest-physical address space. That is, the virtualization layer allows the kernel mode driver 362 to choose the guest-physical memory address range for mapping the buffers of the communication interface 600.

In an embodiment, a backing store for the shared memory buffers is allocated (provided) by the virtualization layer, e.g., in host-physical memory, such that the agent is the only in-guest process aware of the existence of the buffers, i.e., only the agent is aware that the communication interface exists in memory. The virtualization layer 310 provides the backing store for the host-physical memory allocated for the buffers (e.g., by controlling the translation from guest-physical addresses to host-physical address) to prevent control of that shared memory resource by the guest operating system. Thus, the memory buffers are hidden from the guest operating system, which ensures that the guest operating system kernel 230 does not page out (swap) the buffers to disk or modify them in any way. Moreover, the virtualization layer 310 may protect (e.g., restrict access permission to) the buffers of the communication interface, e.g., against misuse, by ensuring that the interface is only visible when the agent is active (running) and is otherwise inaccessible to the guest operating system kernel 230 and to direct memory access operations from I/O devices. Note the virtualization layer may also protect data structures related to interrupt vector handling (e.g., IDT, GDT and TSS as described later herein) to prevent tampering (e.g., modification) by malware. An example technique for protecting data structures and/or processes is described in U.S. patent application Ser. No. 15/230,215 titled, Technique for Protecting Guest Processes Using a Layered Virtualization Architecture.

Illustratively, the agent 360 (i.e., its kernel mode driver 362 of interface 600) is configured to select an address range for mapping the buffers into the guest-physical address space. That is, the agent has knowledge of how the guest-physical address space (i.e., virtual machine memory map) is used (allocated) by the guest operating system, and thus, is able to select an address range for the communication interface buffers. Note that placing the address range selection burden on the agent permits the virtualization layer to be independent of the guest operating system. Once the address range is chosen, the virtual device (communication interface 600) is present in (physical) memory 220, e.g., at a location (i.e., host-physical address space) mapped by the virtualization layer to appear (in the virtual machine) at the guest-physical address range requested by the agent. Notably, although the virtual device is resident in the guest-physical address space, the guest operating system kernel 230 has no knowledge of the device or how to use it.

As noted, the interrupt vector is a (direct or indirect) reference or pointer to a location in memory of the ISR. When an interrupt occurs, execution in the guest operating system may involve use of the IDT which, for each interrupt vector, points to an interrupt handler (i.e., the ISR). The interrupt vector is illustratively an interrupt vector that interacts with the ISR installed for the agent 360. The virtualization layer 310 only requires knowledge of the interrupt vector which, when injected into the VM, invokes an interrupt delivery infrastructure of the virtual machine (e.g., an interrupt mechanism of the CPU architecture) as configured by the guest operating system. To protect against nefarious actions (e.g., tampering to prevent detection) by malware, the virtualization layer 310 may override page protections in the guest operating system to render the IDT write-protected using the NPT 430, such that any attempt by the guest operating system kernel 230 (e.g., kernel-privileged malware in the guest operating system) to modify the IDT is prevented. In addition, a trap to the virtualization layer may occur, permitting further analysis to determine whether malware is present and to decide whether to allow the modification (or more likely, reject the attempted modification).

Accordingly when activated, the kernel mode driver 362 of the agent allocates (or registers with guest operating system) the interrupt vector, creates and installs the ISR, chooses a guest-physical memory address range for the buffers of the interface, and then issues the probe request having the interrupt vector to the virtualization layer. The virtualization layer 310 retains the interrupt vector as the H2G doorbell 670 and maps the two buffers into the guest-physical address range chosen by the agent/guest operating system to create the communication interface 600. Additionally, as previously described, to further ensure secure communication over the interface, the virtualization layer may "lock down" (i.e., write-protect) all data structures in the guest operating system related to interrupt delivery, as described in U.S. patent application Ser. No. 15/230,215 titled, Technique for Protecting Guest Processes Using a Layered Virtualization Architecture. In an embodiment (e.g., the x86 CPU architecture), these data structures include (1) the IDT containing the pointer (interrupt vector) to the ISR, (2) a global descriptor table (GDT) which contains a descriptor (e.g., access privileges) of one or more memory segments used for ISR execution, (3) a task state segment (TSS) which contains information such as a stack pointer for the ISR, and (4) the code page for ISR, which contains the code to be executed when the ISR is invoked. Lock down of these data structures, e.g., via the above described technique, prevents tampering from within the virtual machine so as to provide a secure foothold into the guest operating system that is generally unbreakable (immutable), unless virtual interrupts (i.e., I/O interrupts of the virtual machine) are disabled (e.g., by malware) which would render the guest operating system unusable, even to malware.

Once the communication interface 600 is created, messages (packets) may be exchanged in accordance with the request/response protocol phase. In an embodiment, each packet includes a type field that indicates a type of packet (e.g., a network packet, an exploit detection packet and/or a process protection packet) as well as a sequence number field that identifies the packet via, e.g., an ID. The virtualization layer (e.g., the threat protection component) may use the type field to determine the type of packet and use the sequence number field to pair up requests and responses (thus providing an asynchronous interface). Illustratively, the messaging protocol contemplates a generic message format that includes, inter alia, a type field, an operation code field (requesting an operation to be performed) and a sequence number field, such that format may be used for a variety of forms of communication and packets. Note that the interrupt vector that is allocated (or registered) during the setup phase is presumed fixed and used for the lifetime of the VM (guest operating system). That is, the kernel mode driver 362 and ISR are presumed to persist at fixed locations in the guest-physical address space. Illustratively, when the guest operating system starts up and upon initializing the interface, the kernel mode driver 362 allocates the interrupt vector, which the agent 360 provides to the virtualization layer 310. The interrupt vector is then used as the H2G doorbell 670 for the H2G buffer 620 for the existence of the VM. Illustratively, when the VM shuts down and subsequently comes up, i.e., the guest operating system kernel 230 is rebooted, a different interrupt vector may be chosen. However, once the communication interface 600 has been initialized (instantiated), the vector remains constant until the guest operating system is rebooted.

Figure 8:
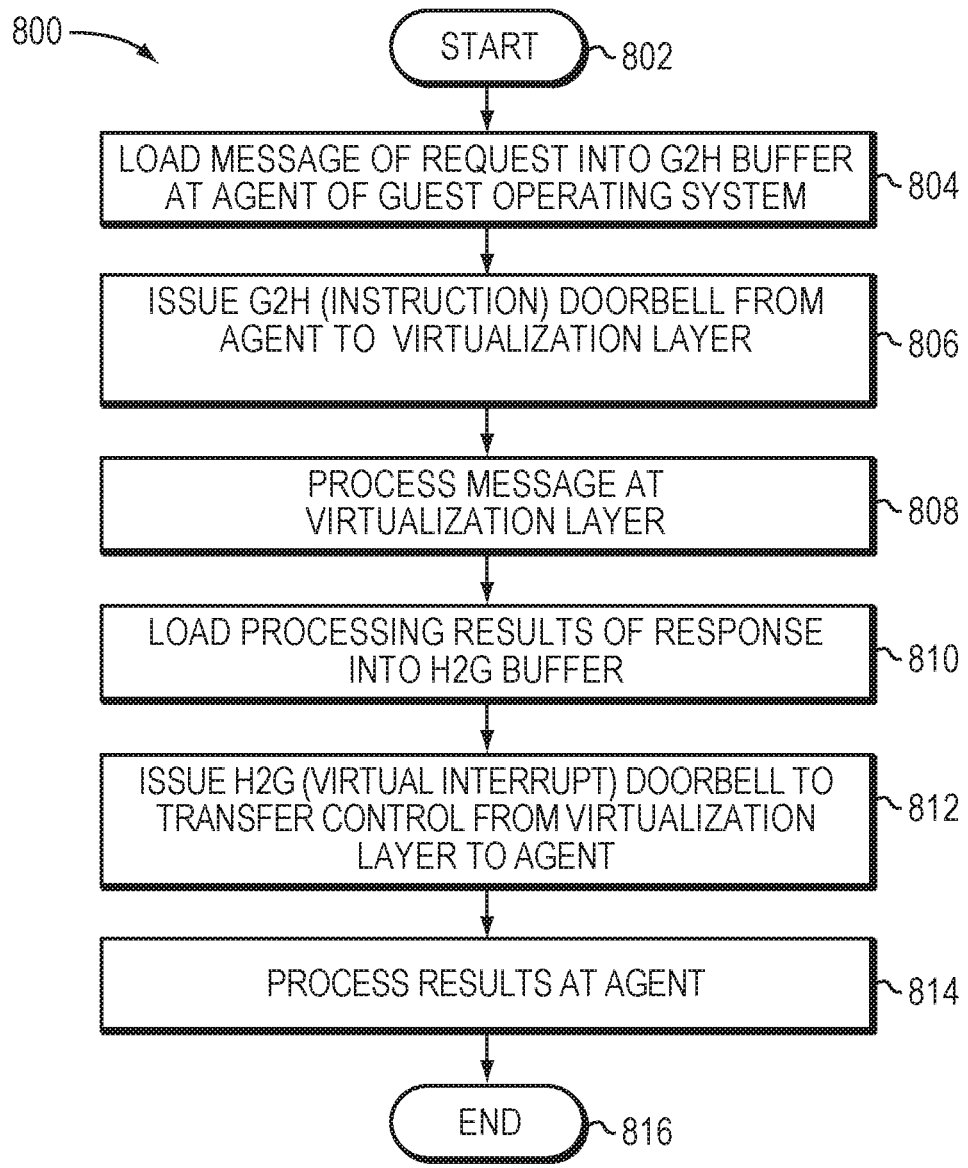
FIG. 8 is an example simplified procedure of a request/response phase of the secure communication technique described herein.

In an embodiment, a request/response messaging protocol may be established across the G2H and H2G buffers of the communication interface 600 to enable bi-directional transfer of information between the agent 360 and the virtualization layer 310. FIG. 8 is an example simplified procedure of a request/response phase of the secure communication technique described herein. Assume the agent 360 requests services of the virtualization layer 310 that requires transfer of information to the virtualization layer. The procedure 800 starts at step 802 and proceeds to step 804 where the agent 360 loads a request having one or more messages along with an ID of that request generated by the agent (e.g., ID X) into the G2H buffer 610 and, at step 806, notifies a hyper-process of the virtualization layer 310 (e.g., guest monitor 352) by issuing (executing) a CPU instruction that causes a VM exit to the virtualization layer. Illustratively, the instruction is a VMCALL instruction in the virtual machine (e.g., the VM), although any CPU instruction that is guaranteed to exit (trap) into the virtualization layer may be used. The CPU (VMCALL) instruction is embodied (acts) as a G2H doorbell 660 to notify the virtualization layer that new messages are present in the G2H buffer 610.

In response to the VM exit, control is transferred to another hyper-process (e.g., the threat protection component 354) of the virtualization layer which examines the G2H buffer 610 and retrieves the request content (messages) from the buffer. Note that, in an embodiment, reception of the notification and retrieval of the message content may be performed at the virtualization layer by a single hyper-process. At step 808, the virtualization layer 310 processes the message in accordance with the request. Subsequently, at step 810, the virtualization layer 310 may load a response having results of the processing along with the ID (e.g., ID X) of the request into the H2G buffer 620. Using the request and response IDs, the agent can determine which response belongs to which request.

According to the technique, the communication interface 600 may be configured to synchronously or asynchronously signal (notify) the agent 360 as to the presence of the response in the H2G buffer 620. For example, the virtualization layer (e.g., the threat protection component 354) may synchronously signal the agent by using a return to the VMCALL instruction, thus configuring the communication interface 600 as a synchronous interface. However, it may be desirable to configure the interface in an asynchronous manner. To that end, the virtualization layer may asynchronously signal the agent through issuance of the virtual interrupt (H2G doorbell 670) to transfer control back to the agent 360 (guest operating system) in the VM (step 812). To asynchronously signal the agent, the threat protection component 354 may instruct the guest monitor 352 of the virtualization layer to inject the virtual interrupt into the guest operating system kernel 230, i.e., generate a device interrupt for the communication interface interrupt in the virtual machine VM. In response to the interrupt injection, the (virtual) CPU may exit the guest operating system (e.g., via a VM exit) and redirect execution flow in the VM to the ISR of the agent, thereby ensuring (guaranteeing) execution time in the guest operating system for the agent. Thus to invoke the ISR, the virtualization layer injects the virtual interrupt vector into the guest operating system kernel 230. Invocation of the ISR passes control to the agent 360, which may then access the H2G buffer 620 to retrieve and process the content (results) of the buffer (at step 814). The procedure then ends at step 816.

Likewise to transfer information to the agent, the virtualization layer (e.g., the threat protection component 354) loads a request having one or more messages along with an ID of the request (e.g., ID Y) into the H2G buffer 620. In an embodiment, a hyper-process (e.g., the guest monitor 352) of the virtualization layer may request the services of the agent 360 to, e.g., forward one or more network packets to the network interface 260 (network driver) and over the network 130. Another hyper-process (e.g., the threat protection component 354) may load the packets into the H2G buffer 620 and notify the agent by injecting the virtual interrupt into the guest operating system. Illustratively, the virtual interrupt is embodied (acts) as the H2G doorbell 670 to notify the agent that new messages are present in the H2G buffer 620. In response, at a later point in time, the agent 360 may answer by loading the ID of the request (e.g., ID Y) into the G2H buffer 610. Again, by matching request and response IDs, the virtualization layer 310 can determine which response belongs to which request.

Advantageously, the technique provides a high-bandwidth, low-latency communication interface 600 between the agent 360 and virtualization layer 310 that is secure and hidden from the guest operating system kernel 230. The secure communication interface may be used with any messaging protocol to exchange messages for a variety of implementations including disk and network accesses, the latter of which may involve downloading of policy files from the network 130 through the guest operating system and into the virtualization layer 310. In addition, the interface 600 may be used for secure communication between the agent and the virtualization layer regarding guest process protection, including notifications for processes being created and destroyed, as well as exploit detection events or other alerts. Furthermore, the interface may be used for secure communication between the agent 360 and the virtualization layer 310 through issuance of requests and responses in arbitrary order, including out-of-order. That is, upon receiving a request, the receiving process can either issue a response immediately (synchronously) or at some later point in time (asynchronously).

While there have been shown and described illustrative embodiments for establishing secure communication between processes of a guest operating system and a virtualization layer of a virtualization architecture executing on a node of a network environment, it is to be understood that various other adaptations and modifications may be made within the spirit and scope of the embodiments herein. For example, embodiments have been shown and described herein with relation to deployment of the virtualization architecture 300 in an endpoint 200$_E$ (i.e., node) of network 130. However, the embodiments in their broader sense are not so limited, and may, in fact, provide for deployment of the virtualization architecture 300 in an appliance, such as MDS appliance 200$_M$, of the network. In such a deployment, the virtualization layer 310 of the architecture may include the micro-hypervisor 320 and hyper-processes 350 described herein. However, instead of one or more micro-VMs, the virtualization architecture may employ one or more full VMs (i.e., fully virtualizing the hardware resources), wherein each VM may run a guest operating system (kernel and guest processes) associated with a guest monitor 352 and thread protection component 354. Although the technique described herein may be deployed in the appliance to establish secure communication between the processes of the guest operating system and the virtualization layer, the MDS appliance 200$_M$ may be further configured to implement measures that make it harder for an attacker to discover that it is running inside a VM. Nevertheless, the secure communication technique provides a light-weight interface presented as a virtual device to the guest operating system in either the endpoint or appliance.

Moreover, the embodiments described herein may be extended to securely harden the communication interface 600 by, e.g., encrypting the entire agent code except for the kernel mode driver 362 that initializes the interface. Once the agent 360 initializes the interface and calls into the virtualization layer, which confirms the identity of the agent, the virtualization layer 310 may decrypt the remaining part of the agent. Before decryption, the virtualization layer may ensure that all of the agent code resides in protected memory, as described in U.S. patent application Ser. No. 15/230,215 titled, Technique for Protecting Guest Processes Using a Layered Virtualization Architecture. Thus, the agent code is not exposed in clear (unencrypted) form to any unauthorized code running in any virtual machine. Accordingly, when inactive, the agent's code is rendered "invisible", i.e., only when active (i.e., running) is the code visible. Furthermore, the binary image stored on disk may be encrypted to make it difficult for an attacker to reverse engineer (off line).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A system comprising:
a memory configured to store a guest process of a guest operating system within a virtual machine of a guest operating system kernel and a hyper-process operating within a virtualization layer, the memory storing a communication interface operating as a virtual device configured for bi-directional transfer of information between the guest process and the hyper-process, the communication interface comprises shared memory; and a central processing unit (CPU) coupled to the memory and adapted to execute the guest process of the virtual machine and the hyper-process of the virtualization layer to:
  issue a request from the guest process to the virtualization layer to discover the communication interface that is not exposed to the guest operating system,
  issue a first response from the hyper-process to the guest process when the guest process is not authenticated, the first response precluding information revealing a presence of the communication interface,
  issue a second response from the hyper-process to the guest process when the guest process is authenticated, the second response including information revealing the presence of the communication interface,
  responsive to the second response, cause a transition of control from the guest operating system to the virtualization layer through a first doorbell notification corresponding to an instruction that halts operation of the virtual machine and notifies the virtualization layer of one or more messages stored in a first portion of the shared memory by the guest process, and
  cause a transition of control from the virtualization layer to the guest operating system through a second doorbell notification that identifies information being stored in a second portion of the shared memory to return control to the guest operating system, and
  wherein the presence of the communication interface is protected by ensuring that the communication interface is (i) accessible to the guest operating system when the guest process is authenticated and (ii) inaccessible to the guest operating system when the guest process is not authenticated.

2. The system of claim 1 wherein the memory is apportioned into host-physical memory controlled by the virtualization layer and guest-physical memory controlled by the guest operating system, and wherein the hyper-process of the virtualization layer, when executed allocates a backing store in the host-physical memory for the communication interface such that the guest process is an only process of the guest operating system in which the backing store is accessible.

3. The system of claim 1 wherein the guest process is an agent operating in the guest operating system kernel of the virtual machine, the hyper process is a threat protection component operating in the virtualization layer, and wherein the agent is adapted to communicate with the threat protection component over the communication interface.

4. The system of claim 3 wherein the first portion of the shared memory comprises a first buffer corresponding to a guest-to-host (G2H) buffer configured to provide unidirectional communication from the agent to the threat protection component.

5. The system of claim 4 wherein the second portion of the shared memory comprises a second buffer corresponding to a host-to-guest (H2G) buffer configured to provide unidirectional communication from the threat protection component to the agent.

6. The system of claim 5 wherein the second doorbell notification is a virtual interrupt embodied as a host-to-guest (H2G) doorbell to notify the agent that one or more messages are present in the H2G buffer.

7. The system of claim 4 wherein the first doorbell notification includes a CPU instruction that causes the transition of control from the guest operating system to the virtualization layer.

8. The system of claim 7 wherein the CPU instruction is embodied as a guest-to-host (G2H) doorbell being the first doorbell notification to notify the virtualization layer that the one or more messages are present in the G2H buffer.

9. The system of claim 1 further comprising:
  establishing execution time for the guest process in the guest operating system by at least associating an interrupt vector to the guest process, the interrupt vector, being used by the hyper-process for the second first doorbell notification, to guarantee execution time for the guest process in the guest operating system.

10. The system of claim 1 wherein the information revealing the presence of the communication interface comprises device-specific information including information for the guest process to access the shared memory.

11. The system of claim 1 wherein prior to the transition of control from the guest operating system to the virtualization layer, the CPU to provide a request including the one or more messages and an identifier of the request to a first buffer corresponding to the first portion of the shared memory.

12. The system of claim 1 wherein prior to the transition of control from the virtualization layer to the guest operating system, the hyper-process of the virtualization layer to provide a response to the request along with the identifier of the request.

13. The system of claim 1 wherein the communication interface is not exposed to the guest operating system when the communication interface is hidden from the guest operating sytem.

14. A method comprising:
  searching for a communication interface by at least issuing a probe request embodied as a hyper-call that causes a transition from a virtual machine to a virtualization layer, the probe request including an interrupt vector allocated to an agent process operating in the guest operating system of a virtual machine (VM) and used as a virtual interrupt by the virtualization layer;
  responsive to locating the communication interface, establishing secure communication between a hyper-process of the virtualization layer and the agent process using a communication interface operating as a virtual device and including a first memory buffer and a second memory buffer of a shared memory, the first memory buffer and the second memory buffer cooperate to support a bi-directional transfer of information between the agent process and the hyper-process, the communication interface supporting signaling to notify both the agent process and the hyper-process that information is available for transfer over the communication interface;
  causing, by the agent process, a transition of control from the guest operating system to the virtualization layer based, at least in part, on a first portion of the signaling operating as a first doorbell notification, the first portion of the signaling includes at least an instruction to halt operation of the virtual machine,
  causing, by the hyper-process, a transition of control from the virtualization layer to the guest operating system based, at least in part, on the interrupt vector operating as a second doorbell notification; and protecting the communication interface by ensuring that the communication interface is inaccessible to the guest operating system unless the agent process is in operation.

15. The method of claim 14 further comprising:
apportioning the shared memory into host-physical memory operating as the second memory buffer controlled by the virtualization layer and guest-physical memory operating as the first memory buffer controlled by the guest operating system; and
allocating a portion of the host-physical memory for the communication interface where the agent process is an only process of the guest operating system with access to the portion of the host-physical memory.

16. The method of claim 14, wherein the probe request embodied as the hyper-call having an instruction that causes an implicit transition from the virtual machine to the virtualization layer, the probe request including the interrupt vector allocated to the agent process in the guest operating system.

17. The method of claim 16, wherein the protecting of the communication interface comprises
exchanging device-specific information about the communication interface between the virtualization layer and the agent process when the agent process is in operation.

18. The method of claim 14 wherein the first memory buffer is a guest-to-host (G2H) buffer configured to provide unidirectional communication from the agent process to the hyper-process and wherein the second memory buffer is a host-to-guest (H2G) buffer configured to provide unidirectional communication from the hyper-process to the agent process.

19. The method of claim 18 further comprising:
establishing a request/response messaging protocol across the G2H buffer and the H2G buffer to enable the bi-directional transfer of information between the agent process and the hyper-process.

20. The method of claim 19 wherein the establishing of the request/response messaging protocol comprises:
loading a request having one or more messages along with a request identifier (ID) generated by the agent process into the G2H buffer to transfer the information from the agent process to the virtualization layer; and
notifying the virtualization layer that the information is present in the G2H buffer by issuing a central processing unit (CPU) instruction in the virtual machine (VM) that causes a VM exit to the virtualization layer, the CPU instruction embodied as the first doorbell notification.

21. The method of claim 20 wherein the establishing of the request/response messaging protocol further comprises:
loading a response with a response ID corresponding to the request ID into the H2G buffer;
notifying the agent process that the response is present in the H2G buffer; and
using the request ID and the response ID at the agent process to associate the response to the request.

22. The method of claim 21 wherein the notifying of the agent process comprises:
synchronously signaling the agent process as to the presence of the response in the H2G buffer by using a return to the CPU instruction, thereby configuring the communication interface as a synchronous communication interface, or
asynchronously signaling the agent process as to the presence of the response in the H2G buffer by injecting a virtual interrupt into the virtual machine to transfer control to the agent process, thereby configuring the communication interface as an asynchronous communication interface.

23. The method of claim 14 wherein the searching for the communication interface comprises:
issuing a first response to the probe request from the hyper-process to a second portion of the shared memory when the guest process is not authenticated, the first response precluding information revealing a presence of the communication interface; and
issue a second response to the probe request from the hyper-process to the virtual machine when the guest process is authenticated, the second response including information revealing the presence of the communication interface.

24. A non-transitory computer readable media including software that is configured, upon execution by circuitry of a node, to perform a plurality of operations comprising:
searching for a communication interface by an agent process of a guest operating system running in a virtual machine by at least issuing a request to a virtualization layer, the request including an interrupt vector allocated to the agent process in the guest operating system and the communication interface operating as a virtual device that is not exposed to the guest operating system;
issuing a first response from a hyper-process of the virtualization layer to the agent process when the agent process is not authenticated, the first response precluding information revealing a presence of the communication interface;
issuing a second response from the hyper-process to the agent process when the agent process is authenticated, the second response including information revealing the presence of the communication interface;
responsive to issuing the second response, causing, by the agent process, a transition of control from the guest operating system to the virtualization layer through a first doorbell notification corresponding to an instruction that halts operation of the virtual machine and notifies the virtualization layer of one or more messages stored in a first portion of a shared memory;
causing, by the hyper-process, a transition of control from the virtual machine to the virtualization layer based, at least in part, on the interrupt vector operating at least in part as a second doorbell notification; and
protecting the communication interface by ensuring that the communication interface is accessible to the guest operating system when the agent process is active in which the agent process is running in the virtual machine and is inaccessible to the guest operating system when the agent process is inactive.

25. The non-transitory computer readable media of claim 24 further including software that is configured, upon execution by the circuitry, to conduct further operations comprising:
apportioning the memory of the node into host-physical memory operating as a second memory buffer controlled by the virtualization layer and guest-physical memory operating as a first memory buffer controlled by the guest operating system; and
allocating a backing store in the host-physical memory for the communication interface where the agent process is a process of the guest operating system with access to the backing store.

26. The non-transitory computer readable media of claim 24 further including software that is configured, upon execution by the circuitry, to conduct further operations comprising:
  determining that the request originated from the agent process; and
  exchanging device-specific information about the communication interface between the virtualization layer and the agent process.

27. The non-transitory computer readable media of claim 24 wherein the first portion of the shared memory comprises a first memory buffer being a guest-to-host (G2H) buffer configured to provide unidirectional communication from the agent process to the hyper-process and a second memory buffer being a host-to-guest (H2G) buffer configured to provide unidirectional communication from the hyper-process to the agent process.

28. The non-transitory computer readable media of claim 27 including software that is configured, upon execution by the circuitry, to conduct further operations comprising:
  establishing a request/response messaging protocol across the G2H buffer and the H2G buffer to enable the bi-directional transfer of information between the agent process and the hyper-process.

29. The non-transitory computer readable media of claim 24 wherein the causing a transition of control from the virtual machine to the virtualization layer comprises:
  loading a request including the one or more messages along with a request identifier (ID) generated by the agent process into a first memory buffer operating as the first portion of the shared memory to transfer the information from the agent process to the virtualization layer; and
  notifying the virtualization layer that the information is present in the first memory buffer by issuing the instruction being a central processing unit (CPU) instruction in the virtual machine (VM) that causes a virtual machine exit halting operation of the virtual machine to the virtualization layer, the CPU instruction embodied as the first doorbell notification.

30. The non-transitory computer readable media of claim 29 wherein the causing the transition of control from the guest operating system to the virtualization layer comprises:
  loading a response with a response identifier (ID) corresponding to the request ID into a second memory buffer of the shared memory;
  notifying the agent process that the response is present in the second memory buffer; and
  using the request ID and the response ID at the agent process to associate the response to the request.

31. The non-transitory computer readable media of claim 30 wherein the notifying of the agent process comprises:
  synchronously signaling the agent process as to the presence of the response in the second memory buffer by using a return to the CPU instruction, thereby configuring the communication interface as a synchronous communication interface.

32. The non-transitory computer readable media of claim 30 wherein the notifying of the agent process comprises:
  asynchronously signaling the agent process as to the presence of the response in the second memory buffer by injecting a virtual interrupt into the virtual machine to transfer control to the agent process, thereby configuring the communication interface as an asynchronous communication interface.

33. The non-transitory computer readable media of claim 24 wherein the communication interface operating as the virtual device is not exposed to the guest operating system when the communication interface is hidden from the guest operating system.

* * * * *